(12) United States Patent
Piggin et al.

(10) Patent No.: US 8,050,223 B2
(45) Date of Patent: Nov. 1, 2011

(54) SYSTEM AND METHOD FOR FACILITATING CO-CHANNEL AND CO-EXISTENCE VIA ENHANCED FRAME PREAMBLES

(75) Inventors: Paul W. Piggin, Wiltshire (GB); Srikanth Gummadi, San Diego, CA (US); Ron Porat, San Diego, CA (US); Kenneth L. Stanwood, Vista, CA (US)

(73) Assignee: Wi-LAN Inc., Ottawa, Ontario (CA)

( * ) Notice: Subject to any disclaimer, the term of this patent is extended or adjusted under 35 U.S.C. 154(b) by 1009 days.

(21) Appl. No.: 11/930,695

(22) Filed: Oct. 31, 2007

(65) Prior Publication Data

US 2008/0253320 A1 Oct. 16, 2008

Related U.S. Application Data

(60) Provisional application No. 60/911,504, filed on Apr. 12, 2007.

(51) Int. Cl.
*H04W 4/00* (2009.01)
(52) U.S. Cl. ......................................... 370/329; 370/350
(58) Field of Classification Search ........... 370/328–350
See application file for complete search history.

(56) References Cited

U.S. PATENT DOCUMENTS

2008/0039107 A1* 2/2008 Ma et al. ................... 455/450
2008/0095195 A1* 4/2008 Ahmadi et al. ............. 370/478

* cited by examiner

*Primary Examiner* — Frank Duong
(74) *Attorney, Agent, or Firm* — Volpe and Koenig, P.C.

(57) ABSTRACT

Enhanced frame preambles facilitate co-channel co-existence in a wireless communication environment by having at least one preamble characteristic that connotes channel-sharing information regarding the wireless communication environment. In an exemplary embodiment, a downlink subframe is received in one or more wireless communication signals in a wireless communication environment. A preamble is detected in the downlink subframe, and at least one characteristic of the preamble is ascertained. Channel-sharing information for the wireless communication environment is determined based upon the at least one characteristic of the preamble. In another exemplary embodiment, a channel is scanned to detect secondary preambles being transmitted on the channel. A current preamble configuration, including a permutation of preamble location and preamble content corresponding to the secondary preambles, is determined, which connote channel-sharing information. A next available preamble location may be adopted based on the current preamble configuration.

13 Claims, 25 Drawing Sheets

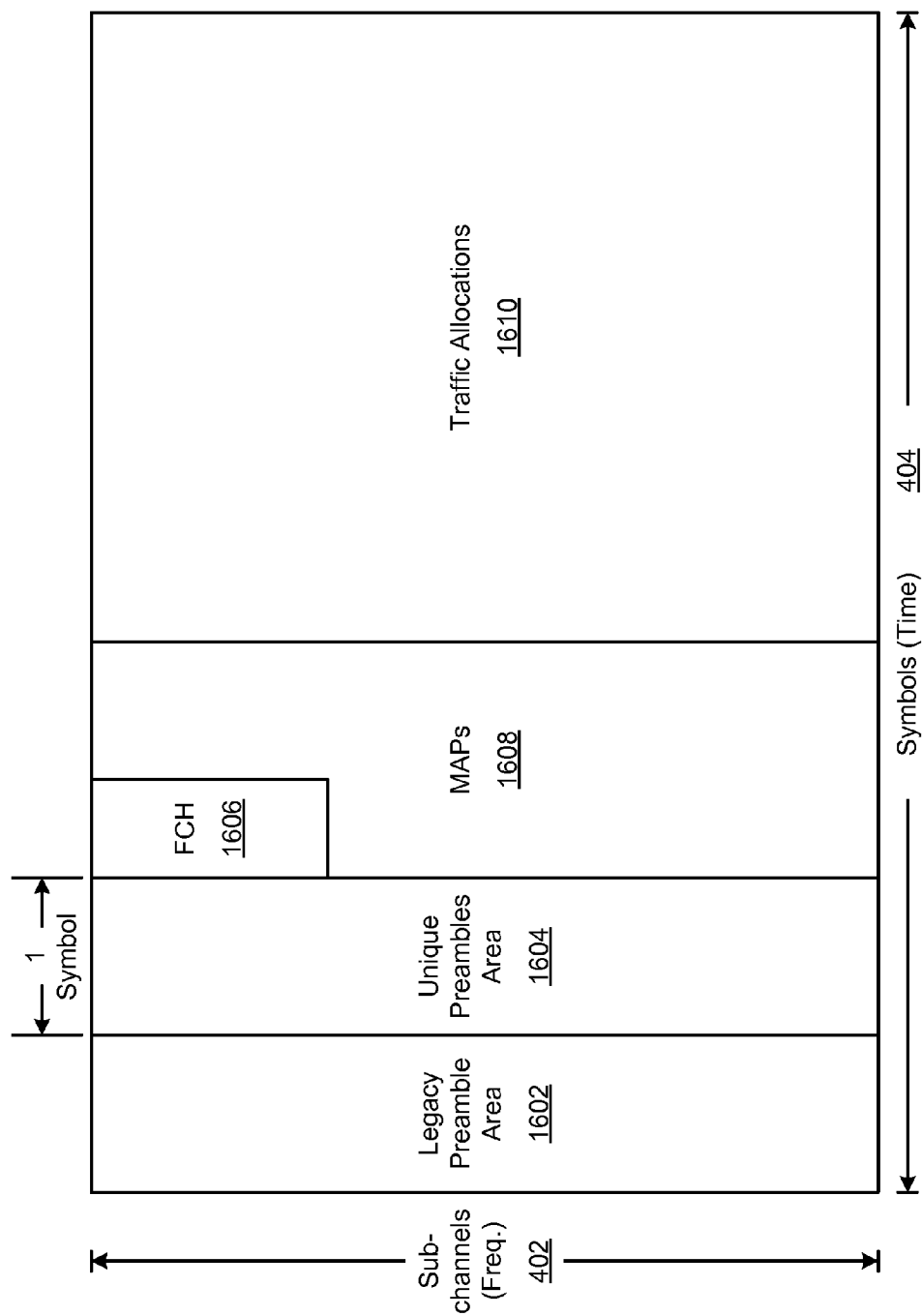

SYSTEM AND METHOD FOR FACILITATING CO-CHANNEL AND CO-EXISTENCE VIA ENHANCED FRAME PREAMBLES

CROSS-REFERENCE TO RELATED APPLICATION

This U.S. Nonprovisional Patent Application claims the benefit of U.S. Provisional Patent Application 60/911,504, filed on 12 Apr. 2007 and entitled "Frame Preambles Supporting a Shared Wireless Environment". U.S. Provisional Patent Application 60/911,504 is hereby incorporated by reference in its entirety.

BACKGROUND

Wireless communication is becoming omnipresent in today's society as people increasingly use cordless phones, cellular phones, texting devices, wireless data communication devices, and the like on a daily basis. The need to communicate wirelessly has become pervasive in all types of environments such as residential homes, businesses, retail establishments, roadways, and so forth. To meet this need, however, there are a few problems to overcome in the wireless communication field.

In general, wireless communication relies on the use of a limited resource: the electromagnetic spectrum. Therefore, it is a critical issue how to maximize the use of spectrum without compromising communication quality. Different wireless communication schemes have been introduced to address this issue by utilizing different bands or segments of the electromagnetic spectrum in different manners. Accordingly, many different wireless standards have been created by a government entity, an industry consortium, and/or some other regulatory body to incorporate some of those communication schemes so that each particular segment of the electromagnetic spectrum is utilized in accordance with at least one specific wireless standard. The increasing number of wireless standards drives a need for harmonization.

In addition, when multiple wireless communication devices are employed simultaneously, especially within an overlapping geographic area and frequency spectrum, there is a strong need to minimize the signal interference and improve synchronization. Typically, a wireless communication device operates under a given standard and in accordance with a given communication scheme. In operation, a device generally receives and transmits electromagnetic signal waves that occupy a portion of the total frequency spectrum. Therefore, wireless communication devices are generally designed to operate within a particular frequency band so as to avoid interfering with competing electromagnetic signal waves.

However, when multiple wireless communication devices share the same bandwidth and the same channel with overlapping communication regions, each device must sufficiently identify and distinguish itself from others in order to reduce signal interferences and communicate properly. Also, in the case of a frequency reuse 1 system where the usage of the complete available frequency spectrum is allowed in all cell sectors, the requirement to minimize signal interferences (i.e., achieve a better Signal-to-interference Ratio (SIR)) is very important to the devices in the border areas of the cells, especially at the three-cell contact points. Traditionally, the wireless communication devices are configured to transmit preambles that include individual respective codes that represent respective ones of the wireless communication devices. Unfortunately, these individual codes of the preambles do not adequately differentiate respective transmissions emanating from respective wireless communication devices for a number of reasons.

First, the preambles can be difficult to locate within the electromagnetic spectrum, especially when the subframes containing those preambles are not transmitted regularly under certain standards. For example, compared with the IEEE 802.16 standard, the IEEE 802.16h amendment to the standard contains additional features, such as the listen-before-talk (LBT) feature, which create scenarios where base stations do not transmit frame preambles every time a subscriber station may expect. Second, the preambles as currently specified in some standards, such as IEEE 802.16, may have properties or individual codes that require significant searching and processing by a subscriber station to detect a preamble. Such properties retard preamble detection and hinder network acquisition, especially in a channel-sharing wireless environment. In light of the above, a need exists to improve operations within a co-channel and co-existence wireless communication environment.

SUMMARY

Enhanced frame preambles facilitate co-channel co-existence by having at least one preamble characteristic that is associated with channel-sharing information. In an embodiment, a preamble characteristic connotes a frame sequence assignment for a base station in a frame sequence cycle. In another embodiment, a preamble characteristic connotes a total number of systems that are sharing a wireless environment. Examples of preamble characteristics include, by way of example but not limitation, a location of a preamble in a subframe, a content of a preamble, and so forth.

In an exemplary embodiment, a method includes receiving at least a downlink subframe in one or more wireless communication signals in a wireless communication environment. A preamble is detected in the downlink subframe, and at least one characteristic of the preamble is ascertained. Channel-sharing information for the wireless communication environment is determined based upon the at least one characteristic of the preamble. The method may also be implemented with a wireless device and/or in conjunction with processor-executable instructions of processor-accessible media.

In another exemplary embodiment, a method involves a base station that is entering a channel-sharing wireless communication environment. The method includes scanning a channel to detect a current set of secondary preambles that are being transmitted on the channel. A current preamble configuration corresponding to the current set of secondary preambles is determined. The current preamble configuration includes a permutation of a preamble location and a preamble content that connotes channel-sharing information for the wireless communication environment. Based in part upon the current preamble configuration, a next available preamble location is adopted for the base station that is entering the wireless communication environment. The method may also be implemented with a wireless device and/or in conjunction with processor-executable instructions of processor-accessible media.

Although features and concepts of the described systems, methods, devices, media, etc. for co-channel co-existence that areas facilitated by enhanced frame preambles can be implemented in any number of different environments, communications systems, processing-based systems, and/or other configurations, exemplary embodiments for facilitating co-channel co-existence in shared wireless environments are described in the context of the following exemplary systems and environments.

BRIEF DESCRIPTION OF THE DRAWINGS

The same numbers are used throughout the drawings to reference like and/or corresponding aspects, features, and components.

FIGS. 16A and 16B are block diagrams of specific exemplary implementations for a frame and for channel bandwidths, respectively.

DETAILED DESCRIPTION OF EXEMPLARY EMBODIMENTS OF THE INVENTION

Figure 1:
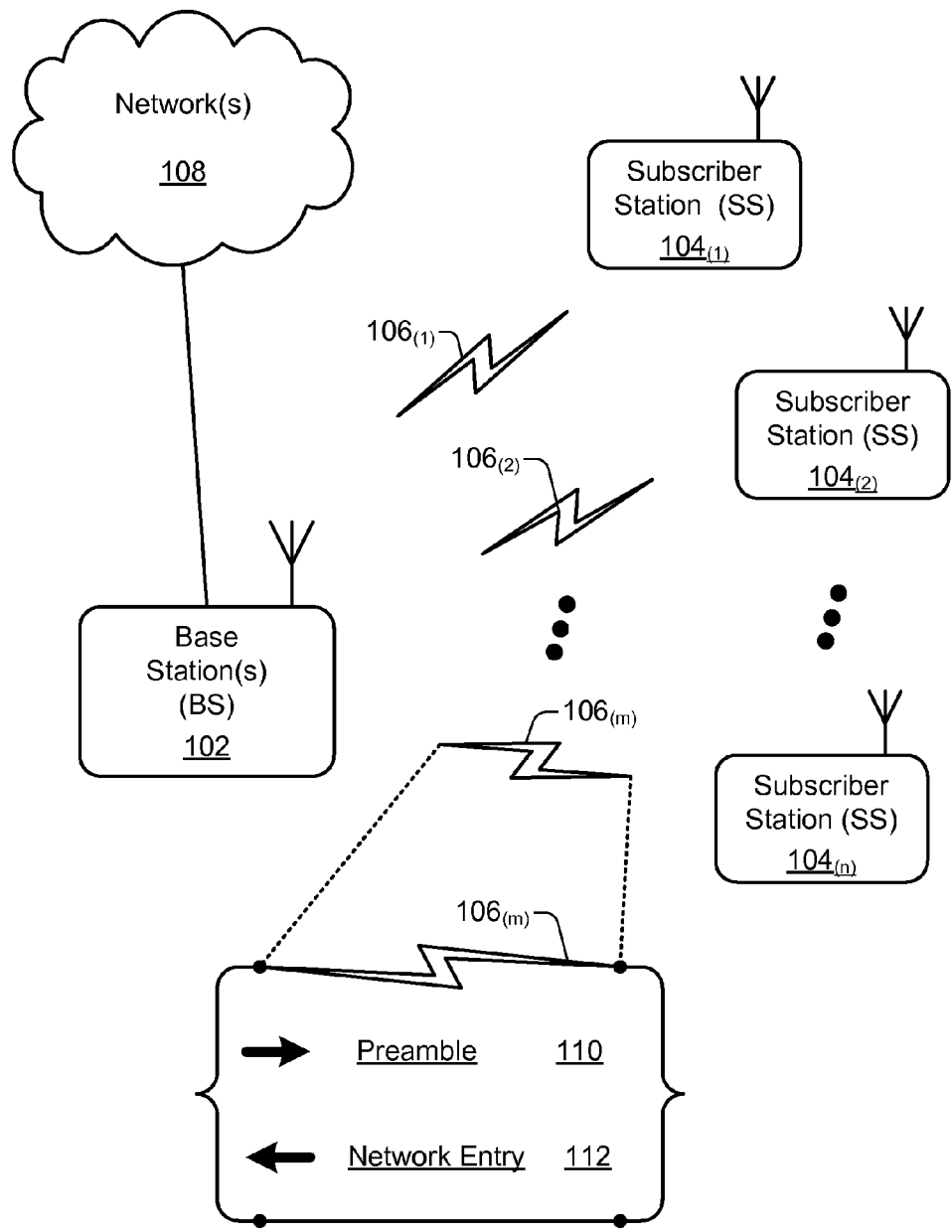
FIG. 1 is a block diagram of an exemplary wireless communication environment including multiple wireless devices and multiple communication links, in which embodiments of the present invention may be implemented.

FIG. 1 is a block diagram of an exemplary wireless communication environment 100 in which various embodiments of enhanced frame preambles may be implemented for facilitating co-channel and co-existence. As shown in FIG. 1, the wireless communication environment 100 includes one or more communication networks 108, multiple wireless communication devices, such as one or more base stations (BS) 102 and an "n" number of subscriber stations (SS) 104, and an "m" number of communication links 106 configured to connect the wireless communication devices, with "n" and "m" being the same or different integers.

In the wireless communications environment 100, many different types of wireless communication technologies may be applied, including but not limited to those pertaining to wireless local area networks (wireless LANs), wireless wide area networks (wireless WANs), wireless regional area networks (wireless RAN), wireless metropolitan area networks (wireless MAN), or ad hoc wireless networks, which, as specific examples, include cellular technology, PCS (personal communication services) technology, WiMax technology, Wi-Fi technology, Bluetooth technology, 3G technologies (e.g., UMTS, HSPDA, CDMA2000, WCDMA), trunking technology, and any hybrid, multi-use, combination or evolution thereof.

As illustrated in FIG. 1, each base station 102 is capable of communicating with each of the multiple subscriber stations $104_{(1)}, 104_{(2)} \ldots 104_{(n)}$ respectively via at lease one of the wireless communication links $106_{(1)}, 106_{(2)} \ldots 106_{(m)}$. Each communication link 106 is configured to facilitate various data signal transmissions between the base stations 102 and the subscriber stations 104. In one embodiment, the communication link 106 may be used to facilitate a transmission 110 from the base station(s) 102 to subscriber stations 104, such as transmission of a frame, a downlink subframe including a preamble by the base station to one or more subscriber stations. In another embodiment, the communication link 106 may be used to facilitate a transmission 112 from a subscriber station 104 to the base station 102, such as when the subscriber station signals to the base station 102 upon its network entry. Typically, each base station 102 is relatively fixed, as compared with subscriber stations 104 which can be mobile, nomadic, or stationary. Although FIG. 1 depicts the base station (BS) 102 as communicating with an "n" number of subscriber stations 104 in one general direction, in operation the base station 102 may be simultaneously communicating with any number of subscriber stations 104 in any number of directions, including in different sectors or omni-directionally.

As illustrated in FIG. 1, the base station 102 is capable of accessing one or more network(s) 108, typically through a connectivity service network (not shown in FIG. 1). The network(s) 108 may be the Internet, ASP, IP network, corporate network, any other public networks or a combination thereof or PSTN (public switched telephone network), 3GPP and 3GPP2, or a combination thereof. In operation, the access to the network(s) 108 enables the base station 102 to forward data from subscriber stations 104 to external network locations and vice versa. The network(s) 108 may also be used for other general backhaul purposes.

The base station 102 may be, for example, a nexus point, a trunking radio, a switch or router, an access point, a traditional cellular base transceiver station (BTS), some combination and/or derivative thereof, and so forth. Subscriber stations 104 may be, for example, a hand-held device; a server computer, a client computer, a personal computer, a desktop computer, a notebook computer, tablet, and/or palmtop computer; a wireless expansion card, module, adapter, or similar apparatus that is coupled to a computer or other device; a storage device; a set-top box or other television-related device; a personal digital assistant (PDA) or portable entertainment device; a mobile phone or other mobile appliance; a digital music player; a vehicle having a wireless communication device; a wireless router; a node of a wireless mesh network; a portable inventory-related scanning device; any device capable of processing generally; some combination thereof; and so forth.

The base station 102 may interact with subscriber stations 104 in accordance with any individual or combined standardized and/or specialized air interface technologies and/or wireless schemes. For example, the applicable air interface technologies may include, without limitation, an IEEE 802.11 standard, an IEEE 802.16 standard, an IEEE 802.22 standard, various cellular phone standards, some combination or derivative thereof, or any other such technology. The exemplary wireless schemes may include, without limitation, orthogonal frequency division multiple access (OFDMA) schemes, including both time division duplexing (TDD) and frequency division duplexing (FDD); orthogonal frequency division multiplexing (OFDM) schemes, including both TDD and FDD; time division—code division multiple access (TD-CDMA) schemes; general frequency division duplexing (FDD) schemes; single carrier (SC) schemes; time division multiplexing (TDM) schemes; some combination thereof; and so forth. Moreover, the applicable wireless schemes include those requiring line of sight (LOS) communications as well as those allowing non-line of sight (NLOS) communications.

Figure 2A:
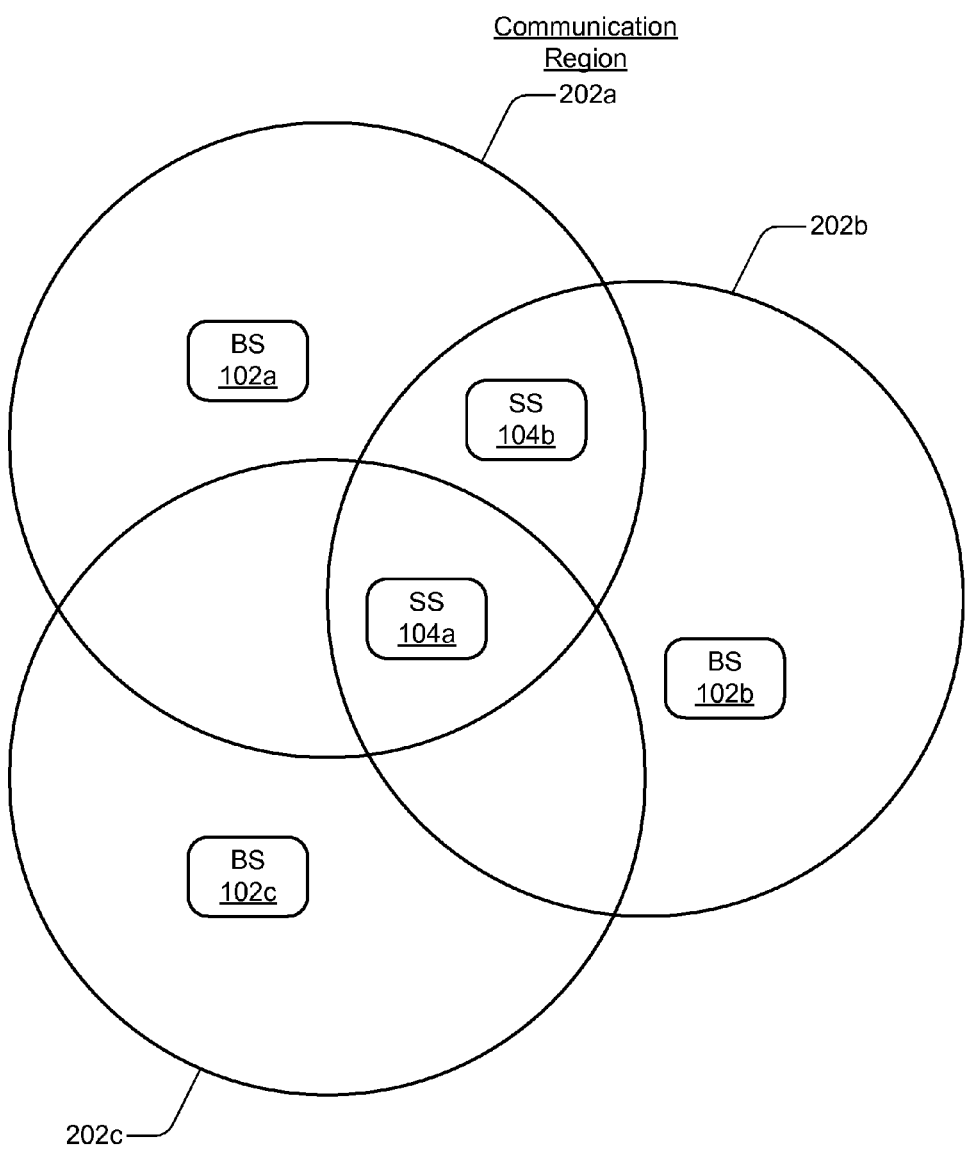
FIG. 2A provides a high-level view of an exemplary multi-system wireless environment where multiple base stations share a wireless channel.

FIG. 2A provides a high-level overview of a multi-system wireless communication environment 200A where multiple base stations 102 share a wireless channel. As illustrated in FIG. 2A, in this multi-system wireless communication environment 200A there are three base stations 102a, 102b, and 102c, each covering a corresponding communication region, i.e., communication regions 202a, 202b, and 202c respectively. To the extent that some of these communication regions may overlap, signal interference can be caused between those communication links 106 (of FIG. 1) emanating from base stations 102 to subscriber stations 104. For example, in FIG. 2A due to the overlap between the communication regions 202a and 202b the communications between the base station 102a and subscriber station 104a may experience interference from the communications between the base station 102b and subscriber station 104b.

Figure 2B:
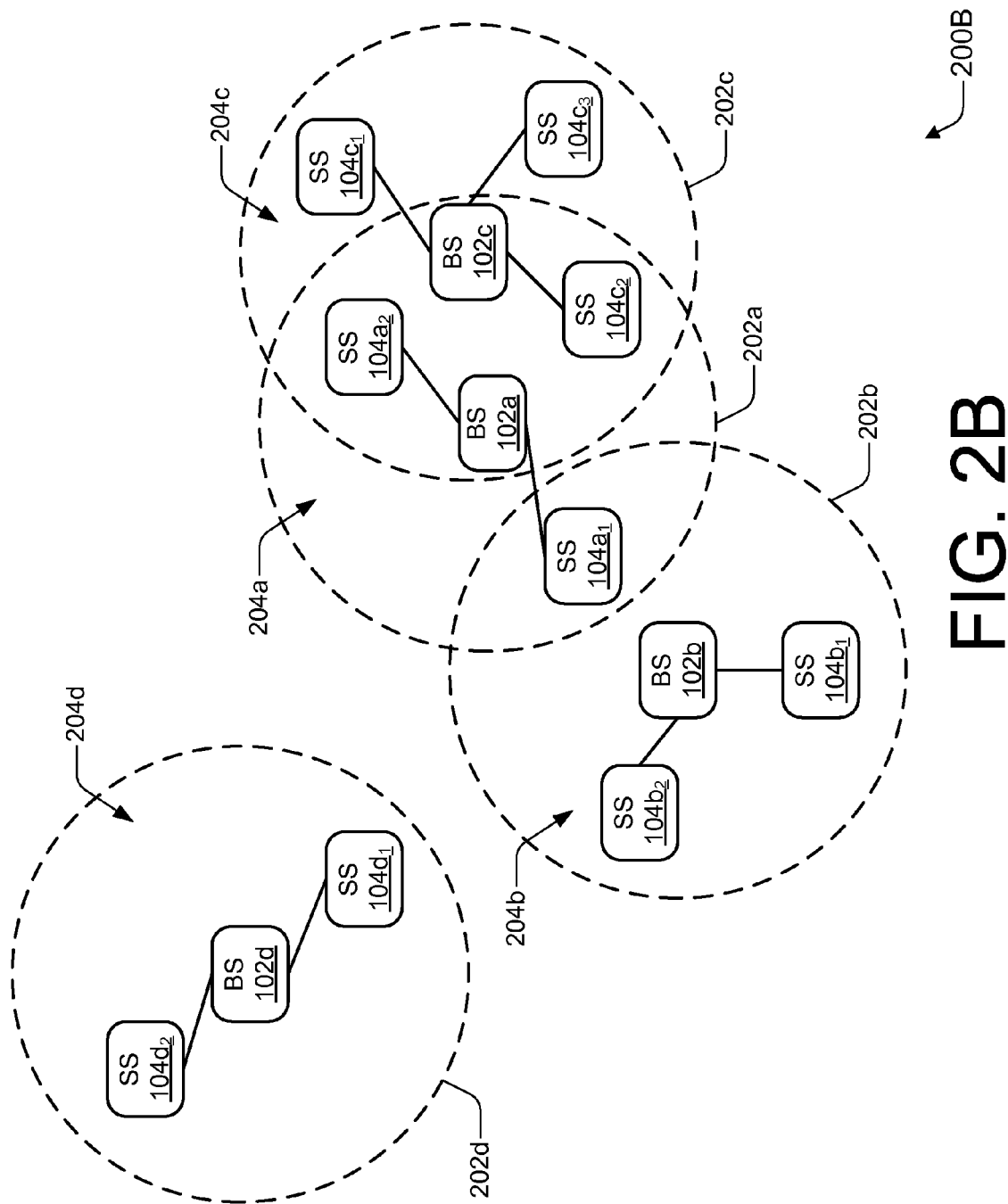
FIG. 2B is a detailed view of an exemplary multi-system wireless environment where multiple base stations share a wireless channel.

Generally, each base station 102 initially attempts to find and select a relatively clear channel for transmitting data signals so as to avoid signal interference. However, as a given geographic area becomes densely populated with base stations 102, eventually two or more base stations 102 may have to share the same channel. This scenario is fully illustrated in FIG. 2B, where a detail view of an exemplary multi-system wireless environment 200B is provided. As shown in FIG. 2B, the multi-system wireless environment 200B includes a number of wireless systems 204. Each system 204 is comprised of at least a base station 102 that communicates with one or more subscriber stations 104 within a respective communication region 202. For example, in the system 204a, there is one base station 102a in communication with subscriber stations $104a_1$, and $104a_2$, which covers the communication region 202a. FIG. 2B depicts four systems 204a, 204b, 204c, and 204d, four base stations 102a, 102b, 102c, and 102d, and four communication regions 202a, 202b, 202c, and 202d, although it should be understand that the number of such systems, base stations and communication regions may vary in practice.

As illustrated in FIG. 2B, the communication region 202a overlaps part of the communication region 202b and part of the communication region 202c. As a result, there can be signal interference between the system 204a and the system 204b, as well as signal interference between the system 204a and the system 204c. On the other hand, because the communication region 202d has no overlap with any other communication regions, the system 204d is not likely to be subject to interference by any other systems in the environment 200B.

As shown in FIG. 2B, between the system 204a and the system 204c, because the base station 102a and the base station 102c fall within the same communication regions 202a and 202c, and therefore they would likely detect transmissions from each other, causing direct interference. In the meantime, because the subscriber station $104c_2$ falls within the communication region 202a of the base station 102a, the communication between the subscriber station $104c_2$ and the base station 102c would likely be interfered with by the base station 102a. On the other hand, between the system 204a and the system 204b, although there is no direct interference between the base stations 102a and 102b, the subscriber station $104a_1$ falls within the communication region 202b of the system 204b, which subjects the subscriber station $104a_1$ to interference by the base station 102b.

Many different strategies can be adopted to enable channel-sharing between multiple wireless systems 204 without compromising the signal transmission efficiency. One strategy is for each channel-sharing base station to be assigned a particular frame in a sequence of frames on a channel. For example, if there are a total of three base stations sharing one channel, each base station may be assigned every third frame in a sequence of frames on the channel. In a four-frame sequence, the non-assigned fourth frame may be shared by all three base stations in each cycle, or can be rotated to each of the three base stations every third cycle. The exemplary frame sequence assignments described below are based on a four-frame sequence, with particular reference to FIGS. 3A and 3B. But it should be understood that many other alternative frame sequence assignments and alternative numbers of frames per frame sequence cycle may be implemented in accordance with various embodiments of the invention.

Figure 3A:
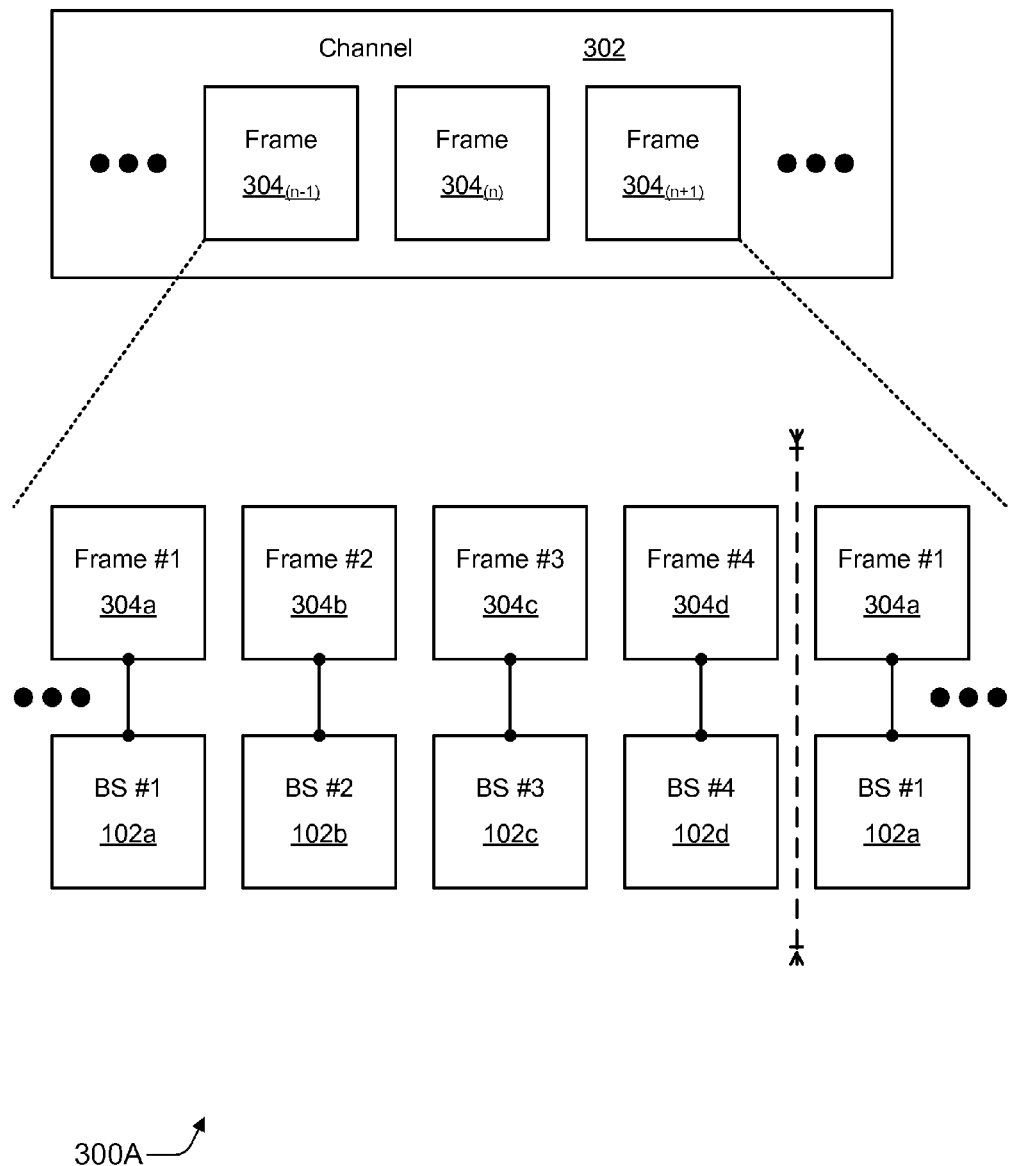
FIG. 3A is a block diagram of an exemplary frame sequence assignment among four channel-sharing base stations.

FIG. 3A is a block diagram of an exemplary frame sequence assignment 300A for sharing a wireless channel 302 among four channel-sharing base stations 102a, 102b, 102c, and 102d. As illustrated in FIG. 3A, the wireless channel 302 includes multiple frames 304, e.g., frame $304_{(n-1)}$, frame $304_{(n)}$, frame $304_{(n+1)}$ . . . , with "n" representing some integer. Without loss of generality, in this example the frame sequence assignment is based on a four-frame cycle. In other words, each frame sequence comprises four frames, e.g., Frame #1 304a, Frame #2 304b, Frame #3 304c, and Frame #4 304d, and each will be assigned to a respective base station. As shown in FIG. 3A, Frame #1 304a is assigned to Base Station #1 102a, Frame #2 304b is assigned to Base Station #2

102b, Frame #3 304c is assigned to Base Station #3 102c, and Frame #4 304d is assigned to Base Station #4 102d. Similarly, the frames in the next fame cycle will be assigned to the four base stations respectively.

Figure 3B:
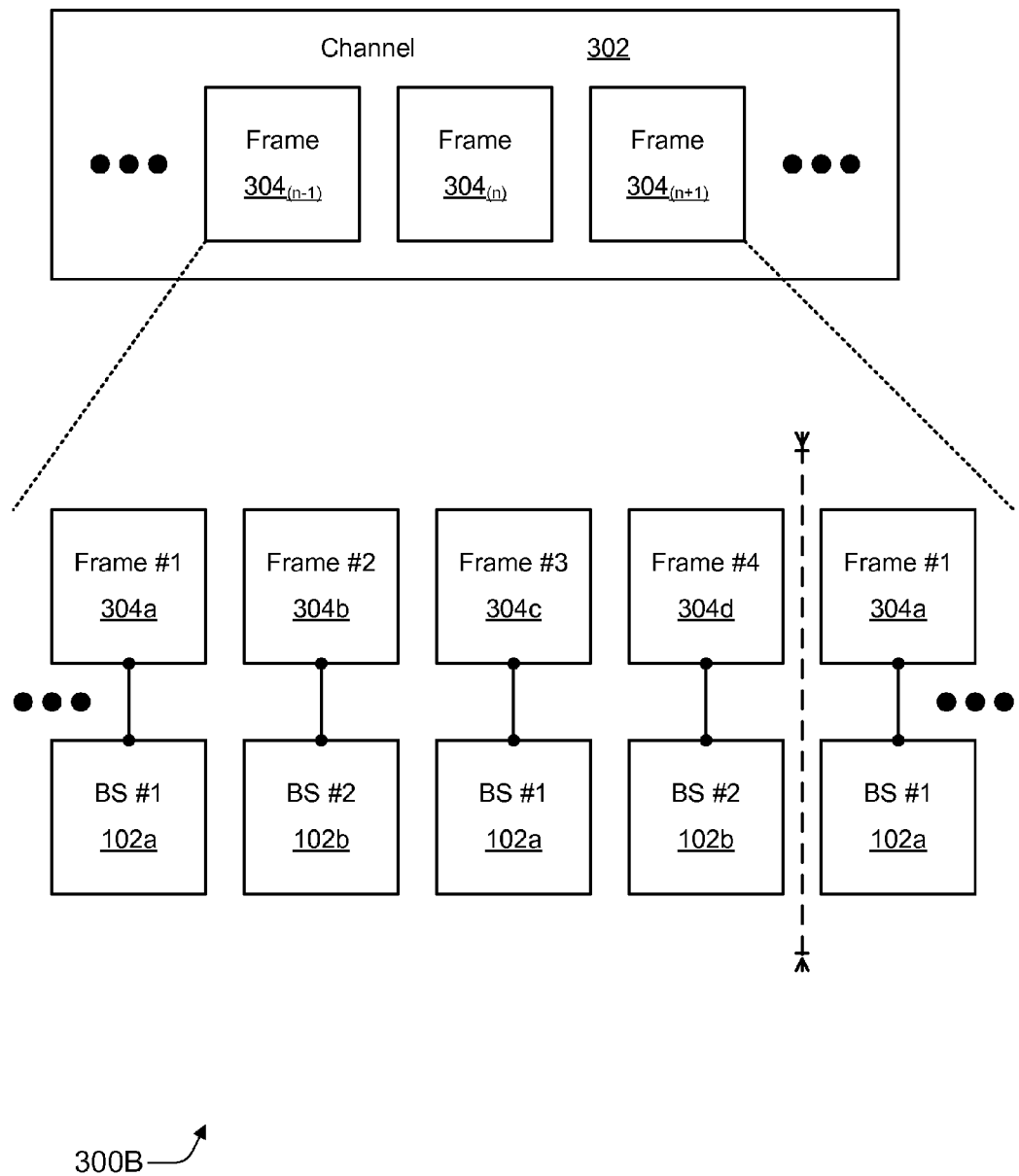
FIG. 3B is a block diagram of an exemplary frame sequence assignment between two channel-sharing base stations.

FIG. 3B is a block diagram of an exemplary frame sequence assignment 300B between two channel-sharing base stations 102a and 102b. In this exemplary embodiment, each base station may be assigned two out of four frames in each frame sequence. As illustrated in FIG. 3B Base Station #1 102a is assigned to Frame #1 304a and Frame #3 304c, while Base Station #2 102b is assigned to Frame #2 304b and Frame #4 304d. In an alternative embodiment of frame sequence assignment (not shown in FIG. 3B), Frame #1 304a and Frame #2 304b may be assigned to Base Station #1 102a, and Frame #3 304c and Frame #4 304d may be assigned to Base Station #2 102b. Other frame sequence assignments that are based on a four-frame cycle but involve fewer than four base stations may also be implemented. Frame sequence cycles other than four may alternatively be employed, and any number of base stations may share a channel, including more base stations than the total number of frames in each frame sequence cycle.

Figure 4A:
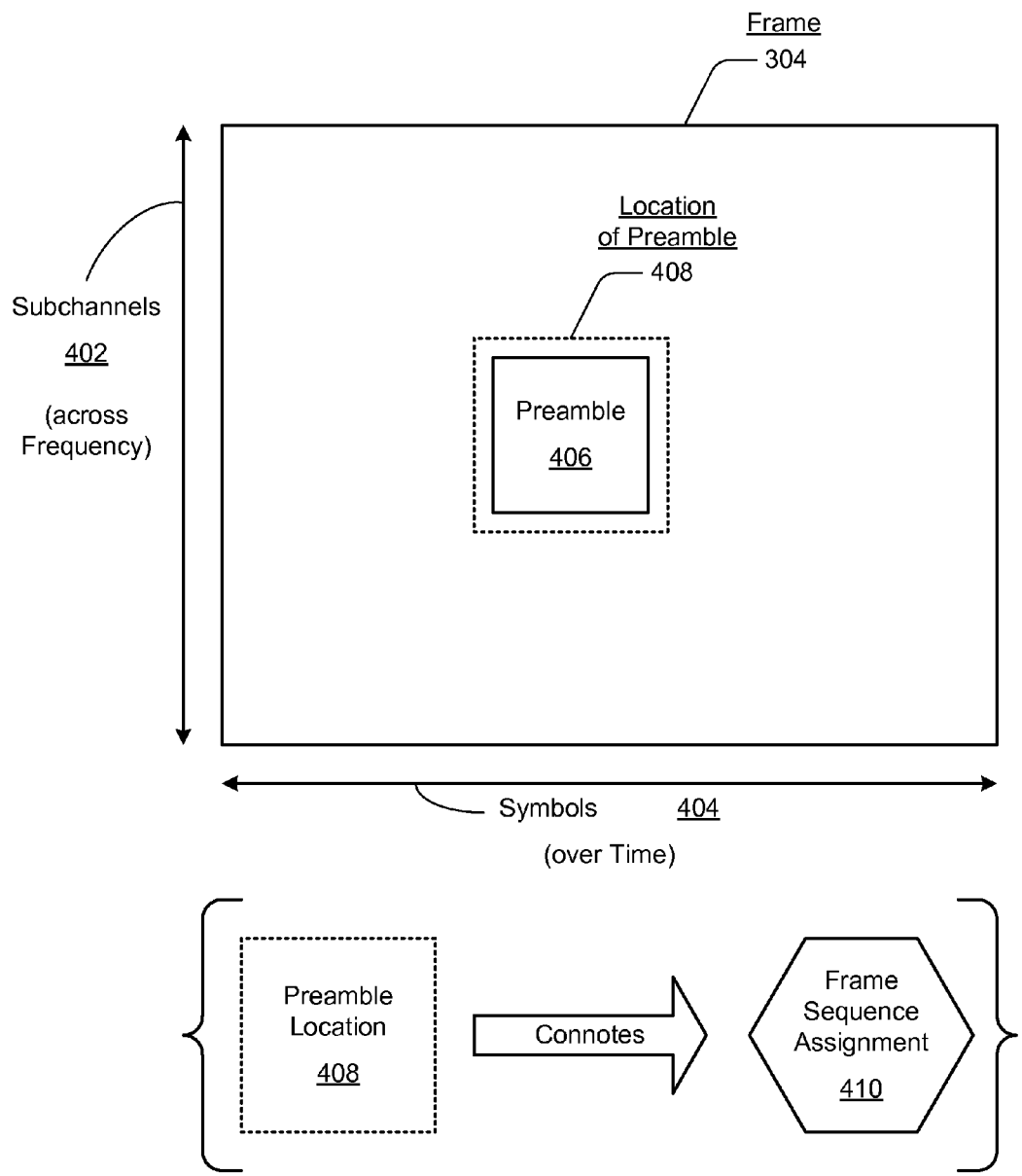
FIG. 4A is a block diagram of an exemplary frame sequence assignment scheme using a preamble location characteristic.
Figure 4B:
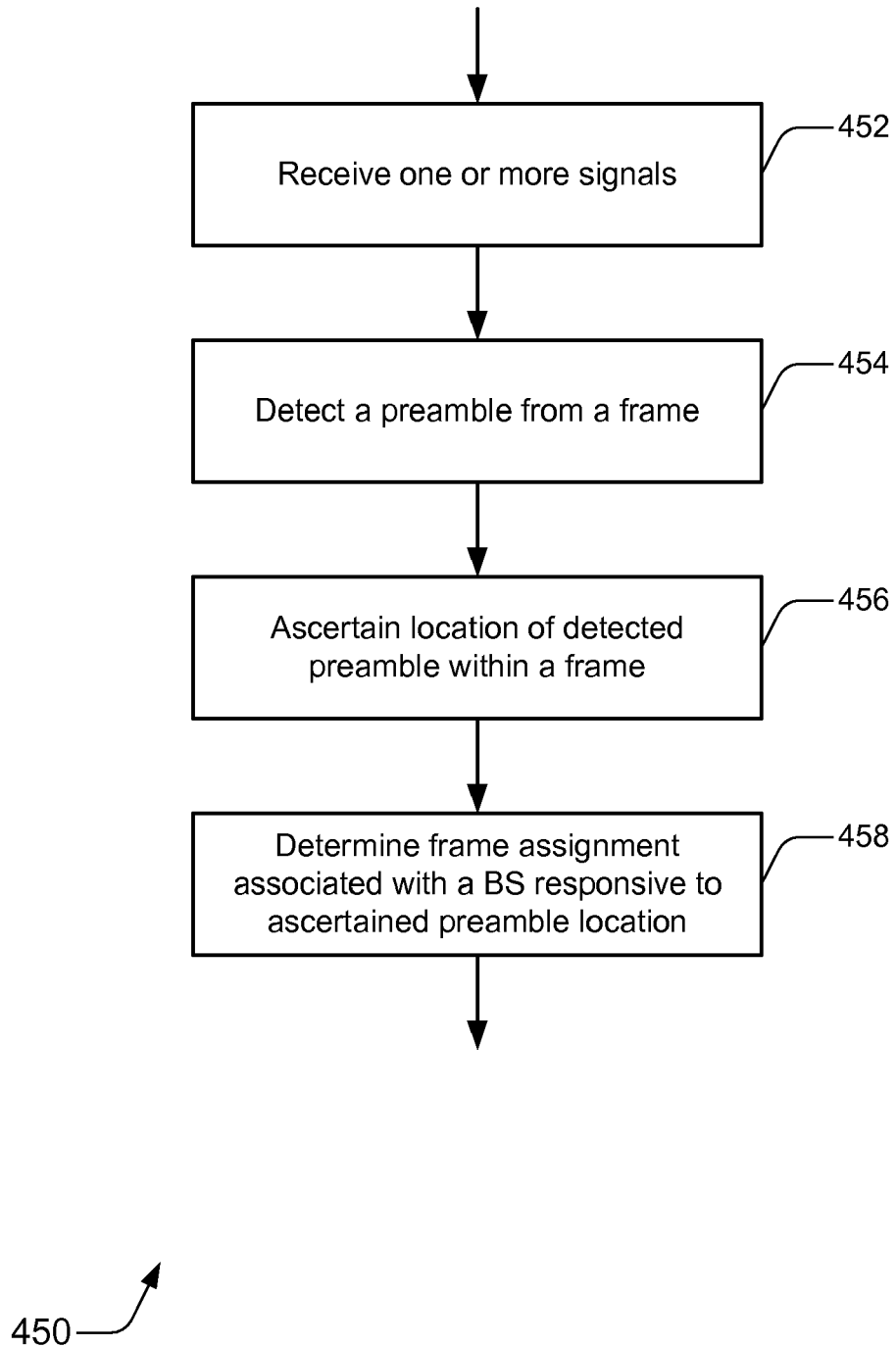
FIG. 4B is a flow diagram that illustrates an exemplary method for determining a frame sequence assignment from a preamble location.

FIG. 4A is a block diagram of an exemplary frame sequence assignment scheme 400 where a frame 304 contains a preamble 406 in a preamble location 408. As illustrated in FIG. 4A, the frame 304 has a frequency dimension and a time dimension. The frequency dimension is divided into subchannels 402, and the time dimension is divided into time slots or symbols 404. A preamble 406 is partially defined by its location within the frame 304, i.e., the preamble location 408, which in general corresponds to a subchannelization having a set of subcarriers. As will be described in detail below with reference to FIGS. 4B and 6-9D, the preamble location 408 can be used to connote a frame sequence assignment 410 that indicates which frame, or more specifically, which downlink sub-frame is being used for preamble transmission by a given base station.

The preamble location 408 generally corresponds to the frequency and time dimensions, or more specifically, corresponds to one or more particular subchannels and/or symbols of a frame. By way of example only, at any specific symbol or symbols in the time dimension, the preamble location 408 further corresponds to a subchannelization that comprises a set of subchannels in the frequency dimension. Although the subchannelization illustrated in FIG. 4A appears to have a set of contiguous subchannels along the frequency dimension, the set of subchannels denoting a preamble location may be non-contiguously distributed over the frame 304. Different embodiments of the preamble location 408 are hereby further described with reference to FIGS. 16A and 16B.

FIGS. 16A provides a block diagram 1600 that illustrates an exemplary format or frame structure of a downlink sub-frame including enhanced preambles. As will be understood by a skilled artisan, many other frame formats may be implemented in accordance with embodiments of the invention. As illustrated in FIG. 16A, the frame format 1600 includes, without limitation to, a legacy preamble area 1602, a unique preamble area 1604, a Frame Control Header (FCH) 1606, a Media Access Control (MAP) area 1608 and a traffic allocation area 1610. The preamble areas 1602 and 1604 extend across a set of subchannels 402 (not including any guard channels), either contiguously or distributed, along the frequency dimension, as well as one or more symbols along the time dimension. The legacy preamble area 1602 hosts primary preambles that contain typical information for physical-layer procedures, such as time and frequency synchronization and initial channel estimation.

The unique preambles area 1604 is created to include one or more secondary preambles (as illustrated in FIGS. 6-9) that contain certain preamble characteristics (e.g., preamble location and preamble content) from which channel-sharing information in a co-channel and co-existence communication environment can be determined. The location of each secondary preamble within the unique preamble area 1604 is defined by the above-described preamble location 408. The preamble areas 1602 and 1604 are followed by the FCH 1606 that provides frame configuration information, such as the MAP message length, the modulation and coding scheme and the usable subcarriers or subchannels. The MAP area 1608 includes uplink and downlink MAP messages that indicate allocations of different data regions of the frame for different users. The traffic allocations area 1610 includes data, such as multimedia content, being sent from a base station to its associated subscriber stations.

In one embodiment, the unique preamble area 1604 comprises one symbol (as shown in FIG. 16A) along the time dimension and within this symbol each secondary preamble is in a relatively fixed location (as shown in FIGS. 6-9). On the other hand, in the frequency dimension how many subcarriers or subchannels and which subcarriers or subchannels are occupied by the unique preamble area 1604, or specifically, each of the secondary preambles, depends on various factors, including the total number of channel-sharing systems (i.e., the number of secondary preambles transmitted over the channel) and the FFT (Fast Fourier Transform) size that may be scaled based upon the available channel bandwidth.

Take four systems sharing a given channel as an example. In the case of 1024 FPT, the two guard bands on each side of the channel each comprise 86 sub-carriers, and as a result, each secondary preamble location corresponds to a set of subcarriers, i.e., SubcarrierSet$_n$=n+4*k, n=0, 1, 2, 3, k =0, 1, . . . 212, where n is the number of channel-sharing systems and k is the number of sub-carriers. Therefore, for 1024 FFT, the length of a secondary preamble may extend up to 213 subcarriers. In the case of 512 FFT, the two guard bands on each side of the channel each comprise 42 sub-carriers, and thus, in SubcarrierSet$_n$=n+4*k, n=0, 1, 2, 3, k=0, 1, . . . 106, and the length of a secondary preamble may comprise up to 107 sub-carriers. Assuming 512 FFT Is applied, the concept of preamble locations and corresponding sub-carriers for different bandwidths are further illustrated in FIG. 16B.

Figure 16B:
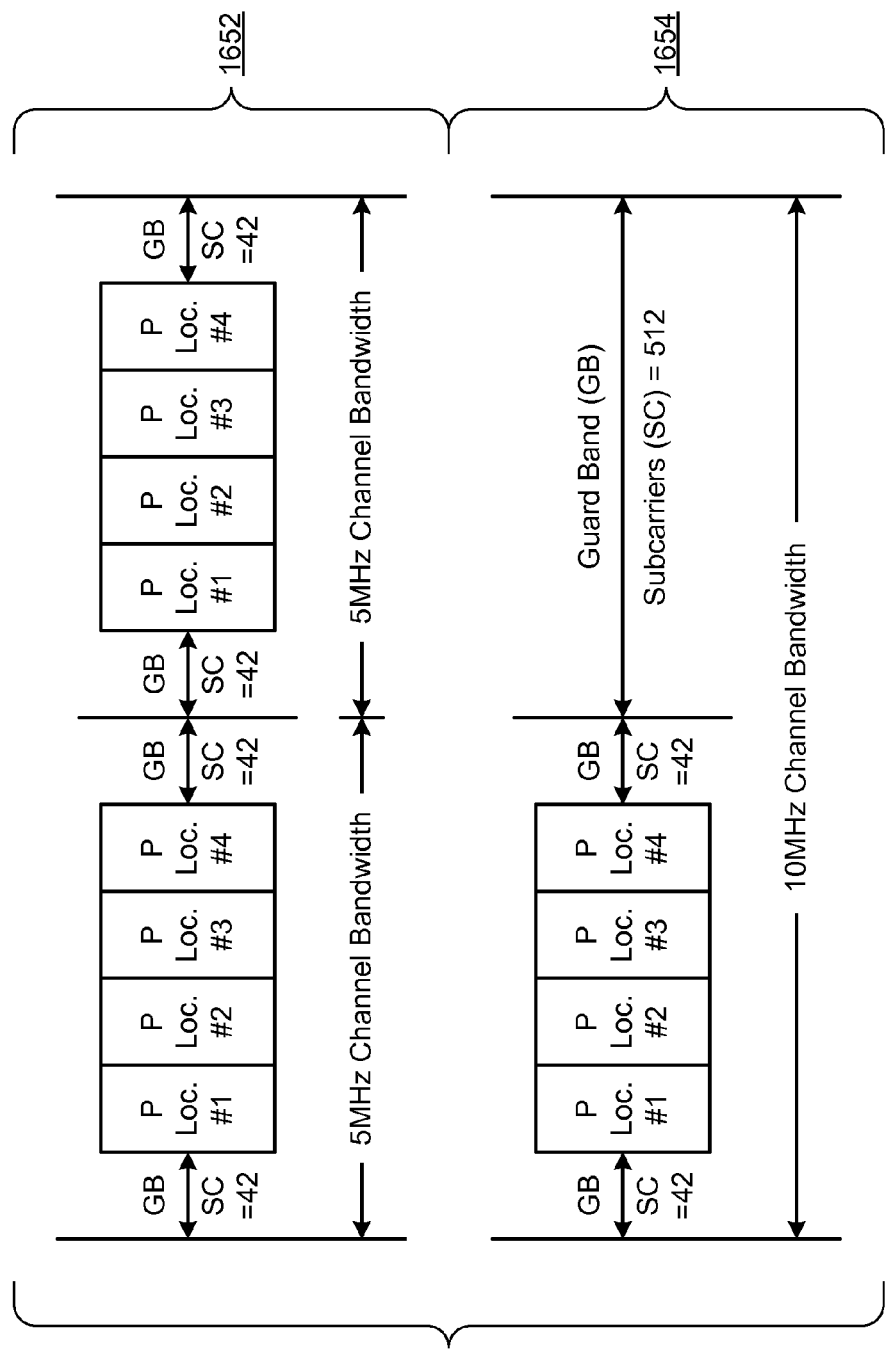

As seen in FIG. 16B at 1650 generally, the block diagram 1652 illustrates a 5 MHz channel including four preamble locations, namely, P Loc. #1, #2, #3 and #4. Because in the case of 512 FFT each preamble location may correspond to 107 sub-carriers (as described above), in a 5 MHz-based system the entire 5 MHz bandwidth (less the guard bands) is used for secondary preambles. As a result, in the co-existence of a 5 MHz-based system and a 10 MHz-based system, the 5 MHz-based system will fully employ the bandwidth while the 10 MHz-based system may only use half of the 10 MHz bandwidth for secondary preambles, as shown in the block diagram 1654. Conversely, if all systems use 10 MHz channels in the communication environment, then the entire 10 MHz bandwidth may be fully employed for secondary preambles. Regardless of the bandwidth, the secondary preambles are transmitted in relatively fixed locations according to one embodiment of the invention. FIG. 16B illustrates the presence of secondary preambles in 5 MHz and 10 MHz channels respectively, but many different channel bandwidths may also be used for implementing embodiments of the invention.

Referring back to FIG. 4B, a flow diagram 450 is provided illustrating an exemplary process for determining a frame sequence assignment from a preamble location. Starting at block 452, one or more wireless signals are received at a wireless communication device, such as a base station or a subscriber station, Among these received wireless signals, at least one signal relates to a frame containing a downlink subframe, from which a preamble can be detected at block 454. At block 456, one characteristic of the detected preamble, namely, the preamble location, is ascertained based upon the sub-carriers or sub-channels used to transmit the preamble symbol. At block 458, in response to the ascertained preamble location, the wireless communication device can determine a frame sequence assignment that indicates which frame in a multi-frame sequence cycle was assigned for the base station that is transmitting the preamble. For instance, if four subchannelizations are predefined as corresponding to four frames in a frame sequence cycle, each subchannelization including a set of sub-channels or subcarriers, and the secondary preamble is ascertained to be transmitted in the second subchannelization of the downlink subframe, the wireless device can determine that the base station transmitting the downlink subframe including the preamble has been assigned to the second frame of the four-frame sequence cycle.

Figure 5A:
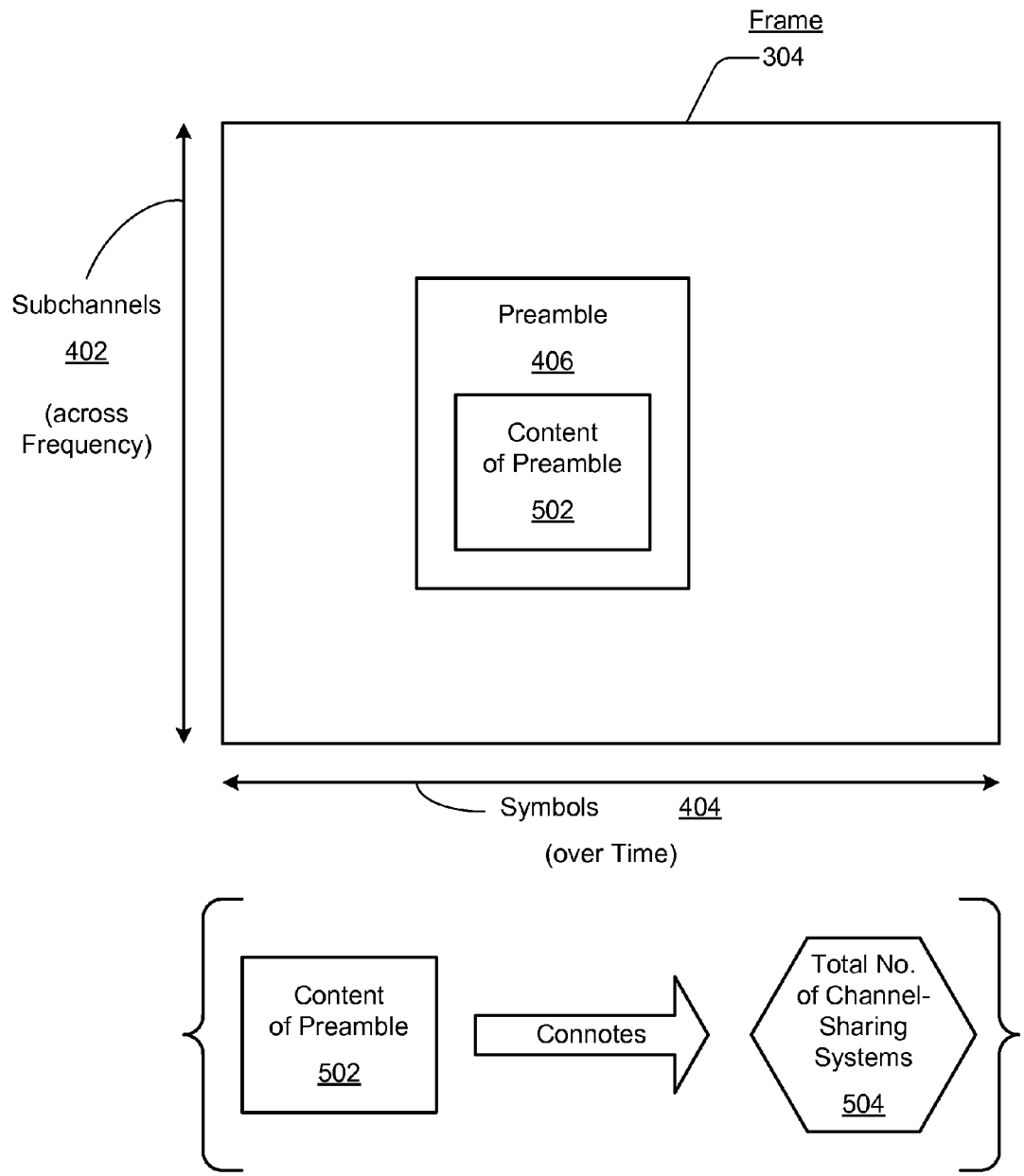
FIG. 5A is a block diagram of an exemplary scheme that uses a preamble content characteristic to indicate a total number of channel-sharing systems.

Another preamble characteristic, namely, preamble content is illustrated in FIG. 5A that depicts a block diagram 500 showing how a total number of channel-sharing systems can be determined from preamble content characteristic of a preamble 406. As illustrated in FIG. SA, the frame 304 includes a preamble 406, which, as described above, may be located anywhere within the frame 304. The preamble 406 has a preamble content 502 that connotes a total number of channel-sharing systems 504 in the wireless communication environment according to one embodiment of the invention. For example, assuming the preamble 406 is detected in a first preamble location, a preamble content 502 equal to zero (0) may indicate that no other systems are currently sharing the channel, while a preamble content 502 having a value of three (3) may indicate that two other systems are currently sharing the channel. Additional examples for preamble content 502 are provided herein below with particular reference to FIGS. 9A-9B and 11.

Figure 5B:
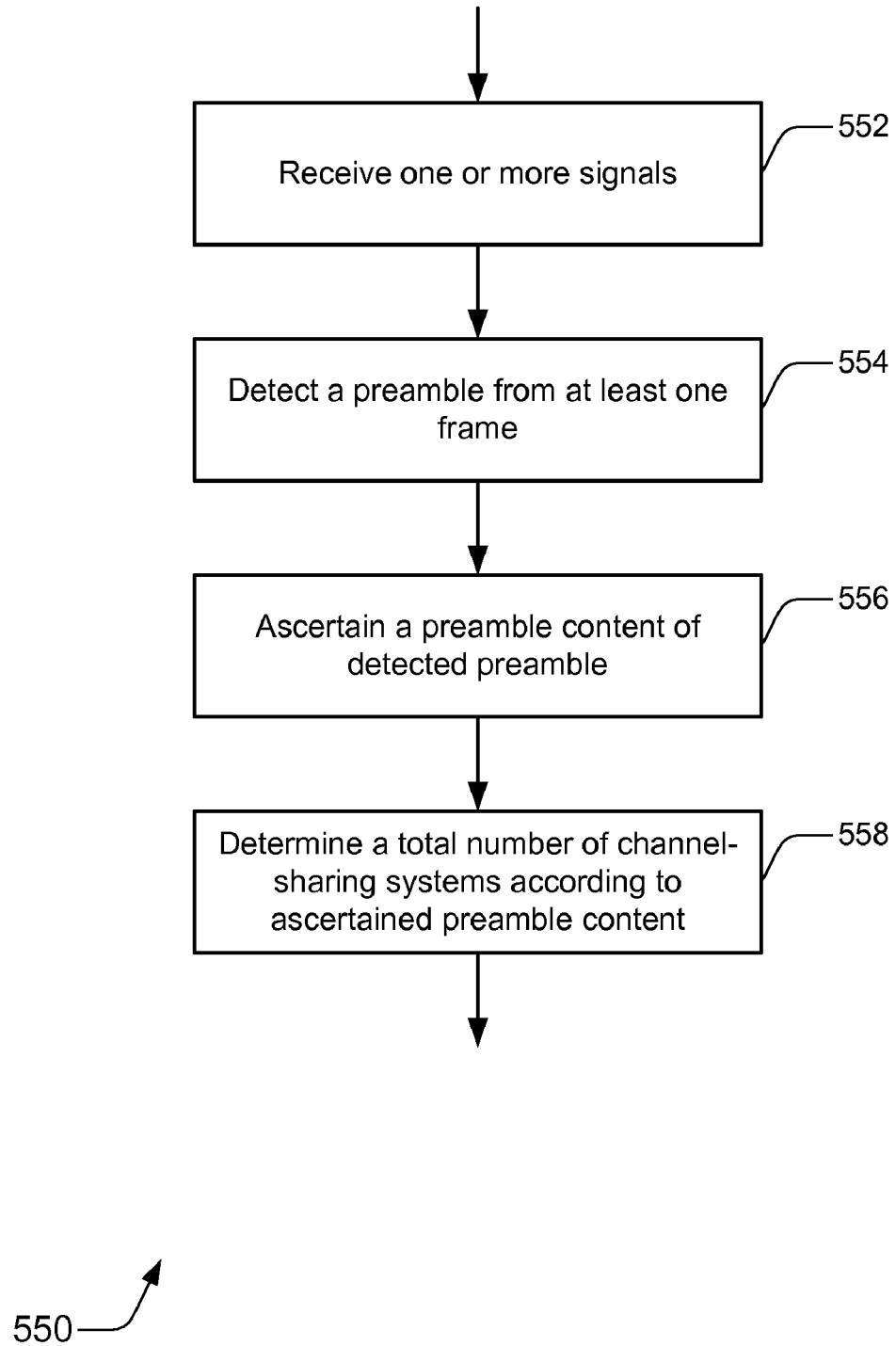
FIG. 5B is a flow diagram that illustrates an exemplary method for determining a total number of channel-sharing systems from a preamble content.

FIG. 5B is a flow diagram 550 that illustrates an exemplary method for determining a total number of channel-sharing systems from a preamble content. The steps in the flow diagram 550 may be performed by a wireless device, such as a base station or a subscriber station. As illustrated in FIG. 5B, the flow diagram 550 starts at block 552 where one or more wireless signals are received at a wireless communication device. Among the received signals, at least one signal relates to a frame having a downlink subframe, from which a preamble can be detected at block 554. At block 556, a preamble content of the detected preamble is decoded and ascertained. Depending on the value of the ascertained preamble content, at block 558, a total number of systems that are sharing the current channel is determined. For instance, if a preamble content 502 has a value of seven (7), then it may be determined that the base station transmitting the preamble is sharing the current channel with three other base stations (see FIG. 9D).

Figure 6:
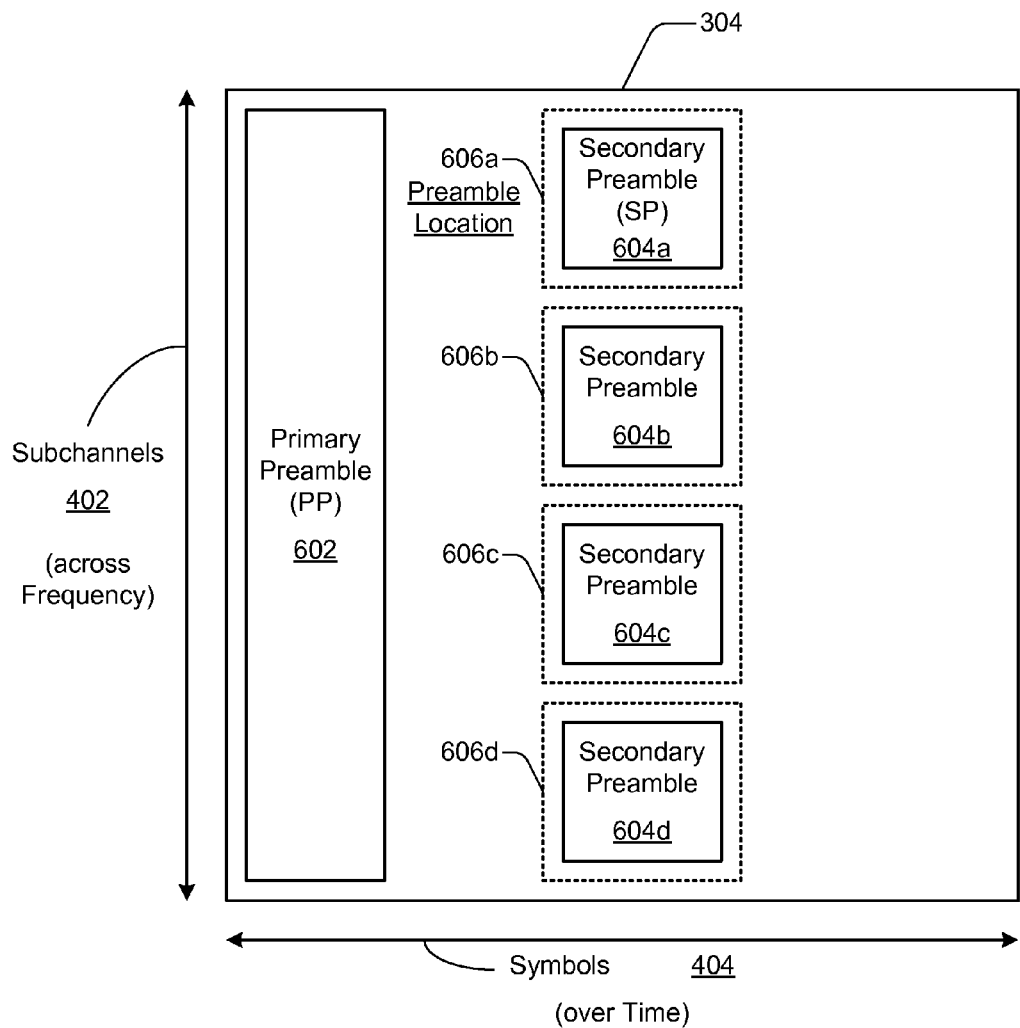
FIG. 6 is a block diagram of an exemplary frame containing different attributes of a preamble.
Figure 7A:
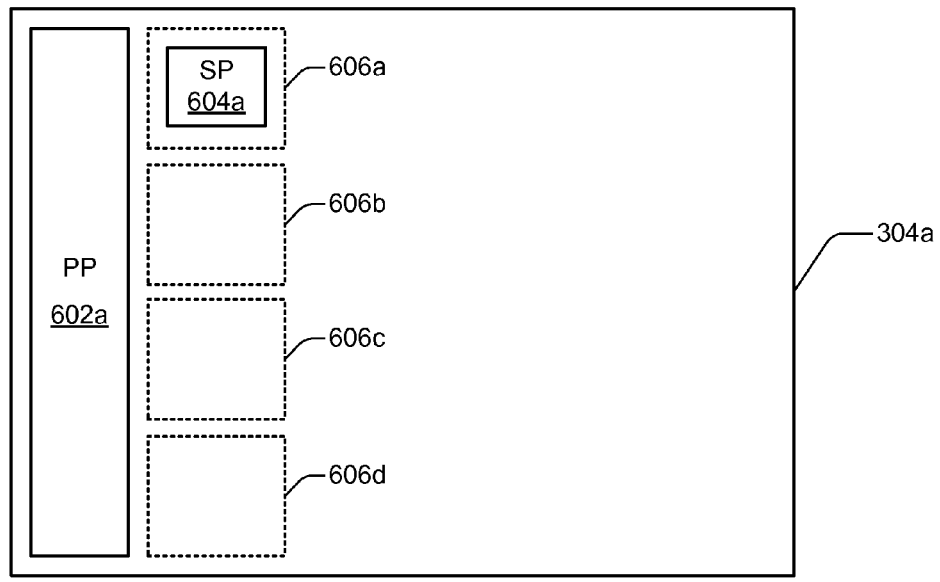
FIGS. 7A-7D are block diagrams of different frames that each illustrate an exemplary channel-sharing scenario in a four-system wireless communication environment.
Figure 7B:
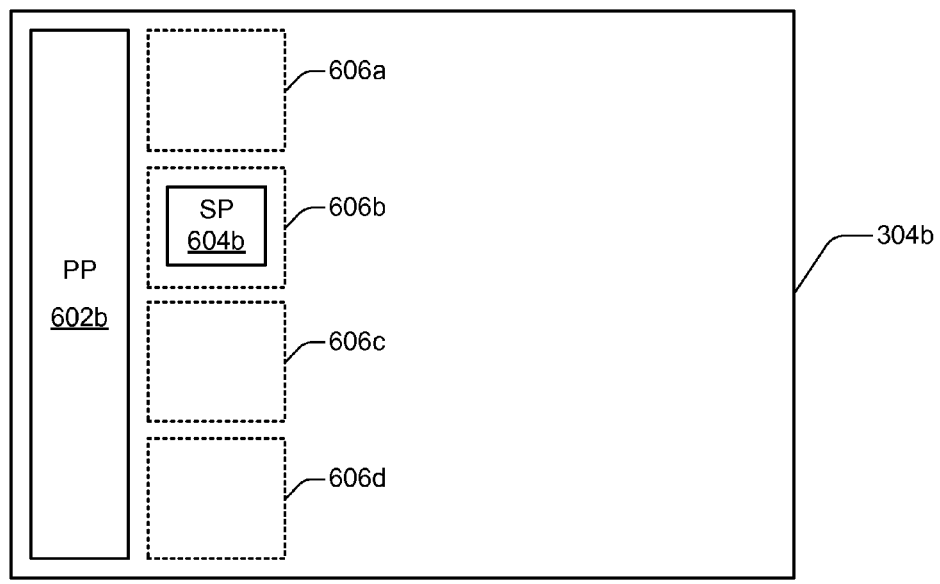
Figure 7C:
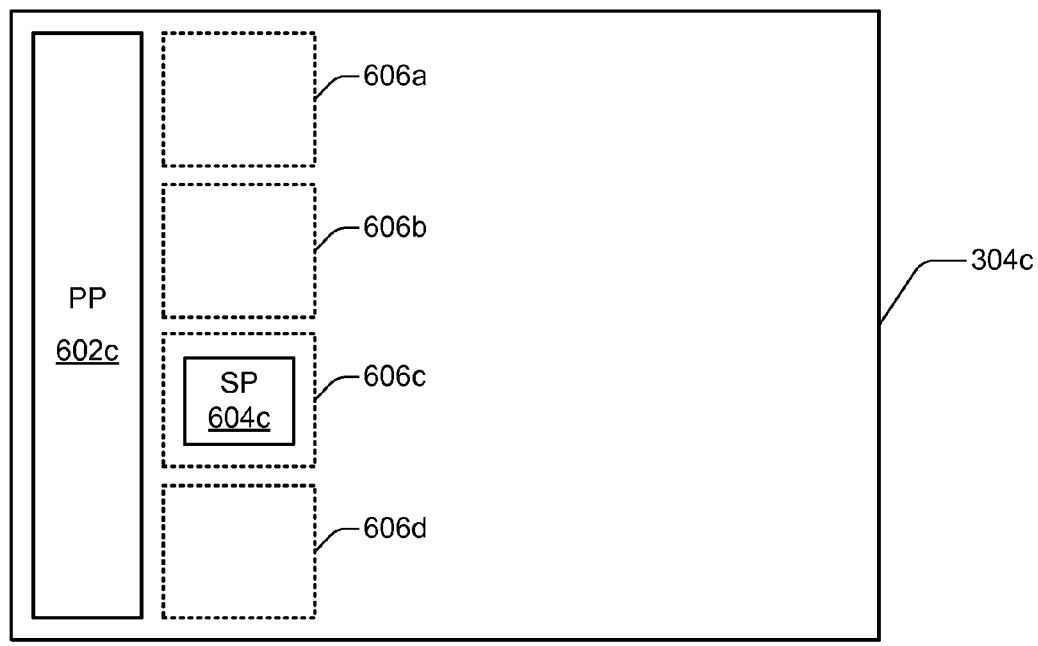
Figure 7D:
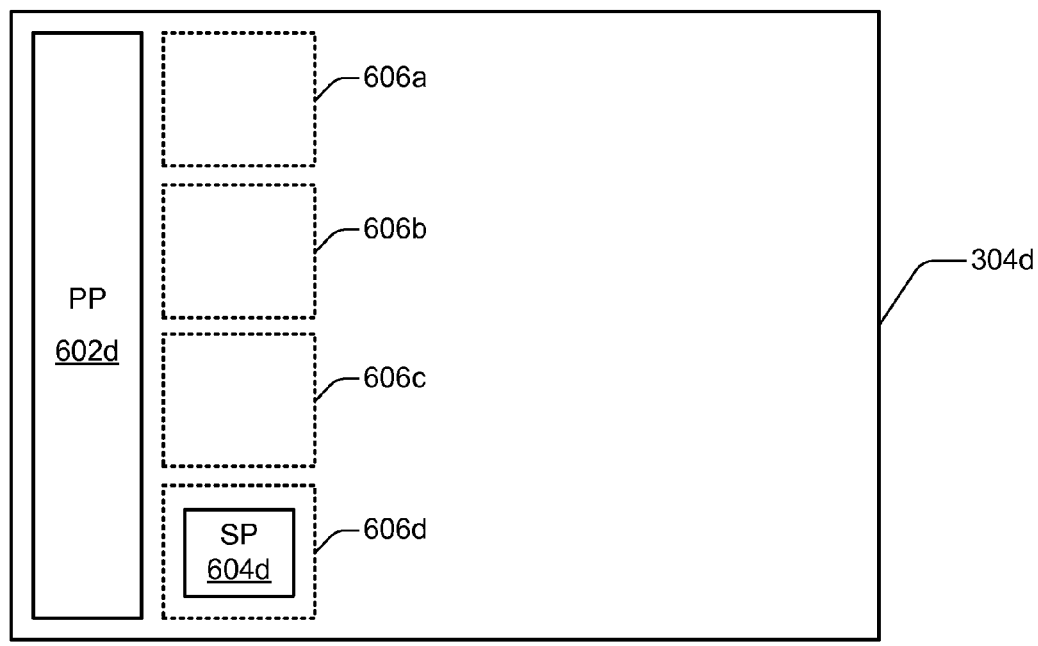

The preamble characteristics, such as a preamble location and preamble content as described above, may be transmitted in the form of a secondary preamble 604 in the unique preamble area 1604 as illustrated in FIG. 16A. FIG. 6 provides a block diagram illustrating an exemplary frame format having a primary preamble as well as secondary preambles. Traditionally, frame preambles only contain information in support of certain transmission activities such as time or frequency synchronization or channel estimation. As shown in FIG. 6, such information can still be transmitted via a primary preamble 602, but the addition of secondary preambles 604 allows channel-sharing information to be transceived so that each base station and subscriber station in a channel-sharing environment may be made aware of the presence of any other base station sharing the channel.

Additionally, as compared with the primary preamble 602 that contains information for all base stations in the same wireless communication environment, the secondary preambles 602 are specific to each channel-sharing system or base station and therefore each secondary preamble is unique within a given channel-sharing environment. For example, the secondary preamble 604a may be transmitted by Base Station #1 in a preamble location 606a, while the secondary preamble 604b may be transmitted by Base Station #2 in another preamble location 606b. In addition, each secondary preamble may contain a preamble content with a unique value, which connotes a total number of channel-sharing systems as described above.

When secondary preambles 604 are fixed and/or identical along the temporal symbol dimension 404 (e.g., as illustrated in FIG. 6), the location of each secondary preamble may correspond to a subchannelization defined by a set of sub-channels or subcarriers that are contiguous or distributed along the frequency dimension 402. It should be understood that although only four secondary preambles 604 are illustrated in FIG. 6, many different numbers of secondary preambles and/or combination thereof can be implemented in accordance with other embodiments.

FIGS. 7A-7D are block diagrams 700A-700D of four different frames 304a-304d that jointly illustrate an exemplary channel-sharing scenario where four systems or base stations, i.e., BS #1, #2, #3 and #4, co-exist and share the channel. In one embodiment, each system or base station transmits a frame that includes a secondary preamble unique to that base station, meaning the secondary preamble is uniquely defined by its location within the transmitted frame and/or its preamble content. For example, a first base station (BS #1) transmits the frame 304a of FIG. 7A, which includes a secondary preamble 604a in a preamble location 606a, and preamble locations 606b, 606c and 606d are empty. A second base station (BS #2) transmits the frame 304b of FIG. 7B, which includes a secondary preamble 604b in a preamble location 606b, while preamble locations 606a, 606c and 606d are empty. A third base station (BS #3) transmits the frame 304c of FIG. 7C, which includes a secondary preamble 604c in a preamble location 606c, and preamble locations 606a, 606b and 606d are empty. A fourth base station (BS #4) transmits the frame 304d of FIG. 7D, which includes a secondary preamble 604d in a preamble location 606d, and preamble locations 606a, 606b and 606c are empty.

Because each secondary preamble is in a unique location within a frame and is uniquely associated with a base station, a receiving device can determine from the received frame a pre-determined frame sequence assignment. For example, in a four-system channel-sharing environment, upon receiving a frame, if the receiving device detects a secondary preamble transmitted at a first preamble location 606a, it may be determined that the frame assigned to the base station for transmission is a first frame (e.g., frame 304a of FIG. 3A) in a four-frame cycle. Similarly, if the secondary preamble is detected at second preamble location 606b, the assigned frame is a second frame (e.g., frame 304b of FIG. 3A) in a four-frame cycle. If a secondary preamble is detected at third preamble location 606c, the assigned frame is a third frame (e.g., frame 304c of FIG. 3A) in a four-frame cycle. If a secondary preamble is detected at fourth preamble location 606d, the assigned frame is a fourth frame (e.g., frame 304d of FIG. 3A) in a four-frame cycle.

Figure 8:
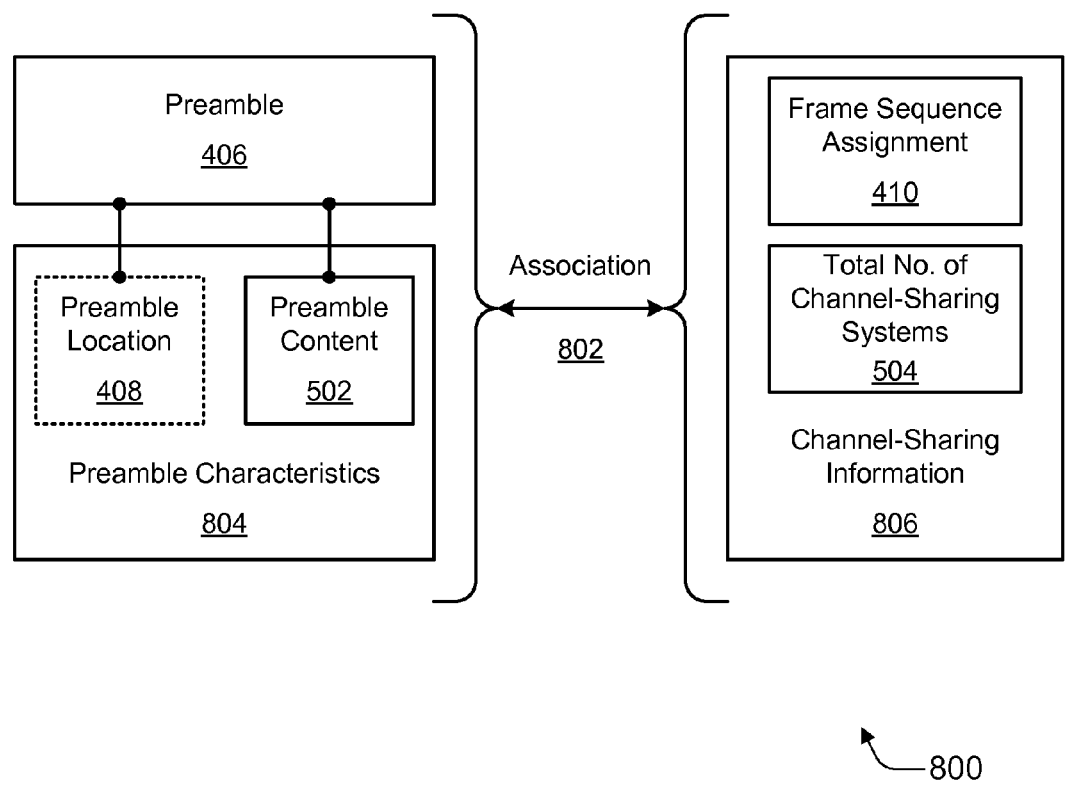
FIG. 8 is a block diagram illustrating an exemplary association between preamble characteristics and channel-sharing information.

FIG. 8 is a block diagram 800 illustrating an exemplary association 802 between preamble characteristics 804 and channel-sharing information 806. As illustrated, a preamble 406 is associated with one or more preamble characteristics 804, including, but not limited to, a preamble location 408 and/or a preamble content 502. Channel-sharing information 806 includes, without limitation, a frame sequence assignment 410 and/or a total number of channel-sharing systems 504. As described above, a preamble location 408 can connote a frame sequence assignment 410, and a preamble content 502 can connote a total number of channel-sharing systems 504. As a result, channel-sharing information can be determined by detecting a secondary preamble containing a preamble location and preamble content.

In a multi-system co-channel environment, because each channel-sharing base station is transmitting a secondary preamble, a plurality of secondary preambles may be detected simultaneously or immediately one after another in a wireless communication device, such as a subscriber station. In a well-synchronized wireless environment, the channel-sharing information determined from each of these secondary preambles should be consistent; otherwise upon detection of any inconsistency, inconsistent preambles can be modified and updated by related base stations and further synchronization may be instituted between those base stations and their respectively associated subscriber stations. A specific example of such inconsistency is described in detail below with particular reference to FIG. 10.

From a high-level view of the wireless communication environment, the channel-sharing information for a given channel-sharing wireless environment may be determined at any time from a preamble configuration which comprises a permutation of preamble locations and preamble content of any detected secondary preambles. Exemplary preamble configurations are described below with particular reference to FIGS. 9A-9D.

Figure 9A:
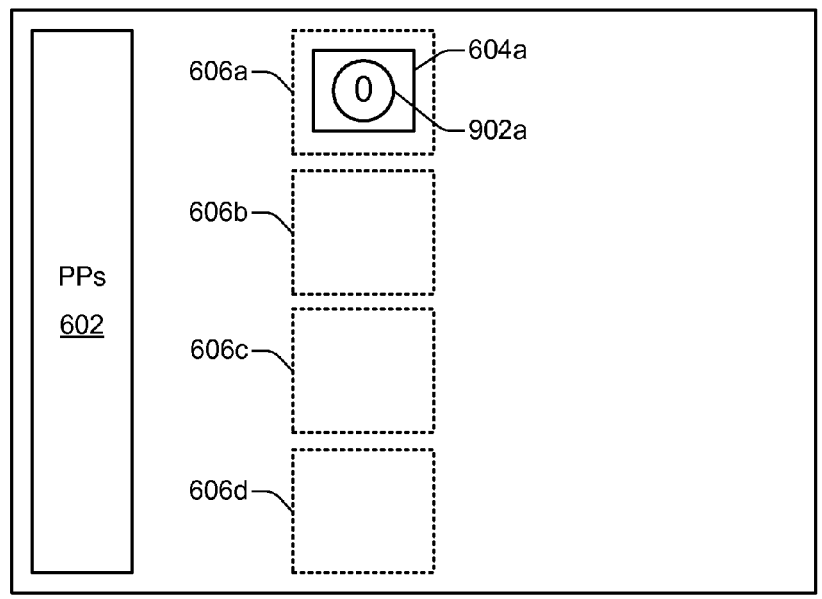
FIGS. 9A-9D are block diagrams illustrating different preamble configurations including preambles with exemplary preamble content corresponding to four different channel-sharing scenarios in a wireless environment.
Figure 9B:
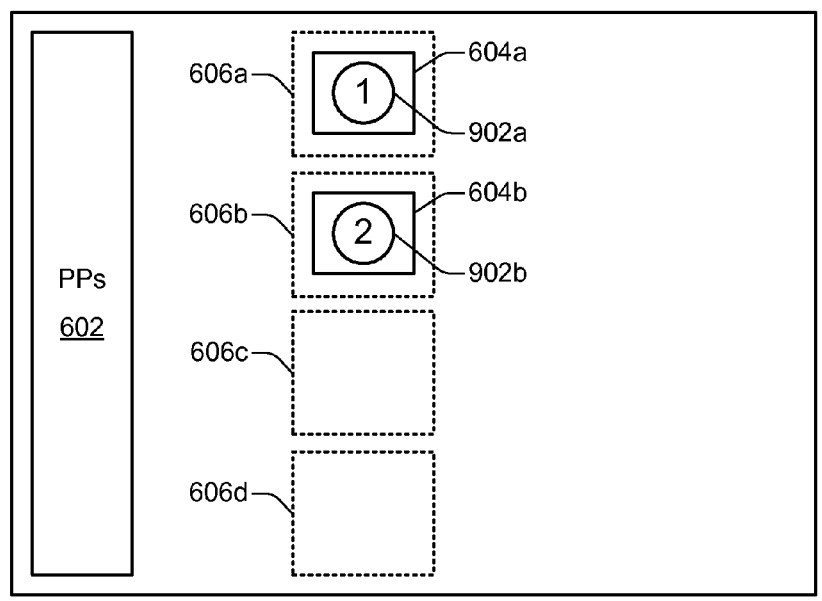
Figure 9C:
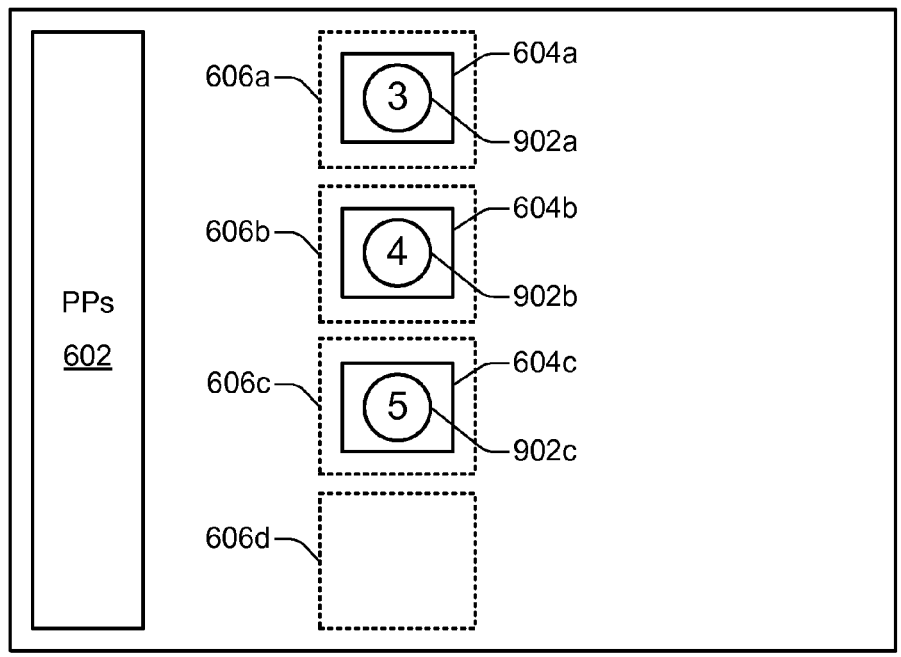
Figure 9D:
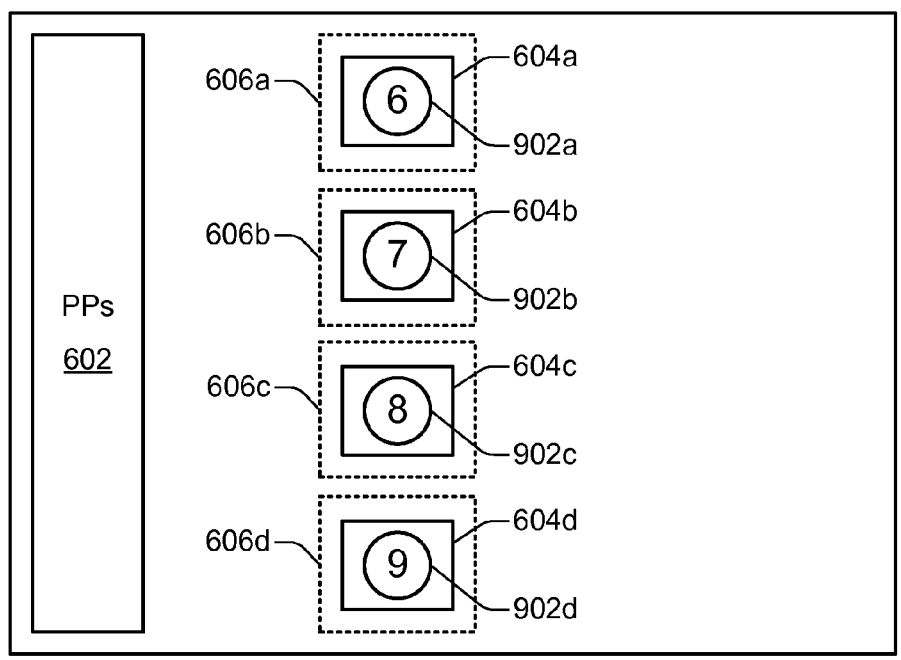

FIGS. 9A, 9B, 9C, and 9D are block diagrams illustrating different preamble configurations 900A, 900B, 900C, and 900D, each including a different set of secondary preambles. These four preamble configurations 900A, 900B, 900C, and 900D correspond to four different channel-sharing scenarios in a wireless environment. Specifically, FIG. 9A represents an environment in which one base station is currently transceiving on a channel, FIG. 9B represents an environment in which two base stations are currently sharing a channel, FIG. 9C represents an environment in which three base stations are currently sharing a channel, and FIG. 9D represents an environment in which four base stations are currently sharing a channel.

In FIG. 9A, the preamble configuration 900A comprises a permutation of preamble location and content derived from one frame, which includes a secondary preamble 604a being transmitted in a first preamble location 606a, with a preamble content 902a having a unique value, for example, a value of zero (0). It can be appreciated by a skilled artisan that the preamble content value can be a specific number (e.g., 1, 2, . . . n), or a letter (e.g., a, b, c, . . . z), or any other code or symbol (e.g., %, $, * . . . ), or any combination thereof. For illustration purposes, specific numbers are described hereinbelow to show different preamble content values in different preamble configurations, and it should be understood that the preamble content value is not limited to those numbers, but may in various forms be tailored to any actual designs. As will be described further below with reference to FIG. 11, if a frame as shown in FIG. 9A is received at a wireless communication device, the device may detect the preamble configuration 900A, and more specifically, that a secondary preamble 604a is transmitted in the preamble location 606a, and/or that the preamble content 902a has a value of zero (0) or any pre-assigned unique value, and further determine that only one system is transceiving on the channel.

In FIG. 9B, the preamble configuration 900B comprises a permutation of preamble location and content derived from two different frames transmitted by two different base stations, and each frame contains a secondary preamble of a different content and transmitted in a different location. In one embodiment, one frame includes a secondary preamble 604a being transmitted in the first preamble location 606a, with a preamble content 902a having a value of one, while the other frame includes a secondary preamble 604b being transmitted in a second preamble location 606b, with a preamble content 902b having a value of two. In operation, if the wireless communication device receives either one of the above-described frames, the device may determine the preamble configuration 900b, and more specifically, one secondary preamble 604a transmitted in the first preamble location 606a having the preamble content 902a of value one (1), or one secondary preamble 604b transmitted in the second preamble location 606b having the preamble content 902b of value two (2). Based upon the preamble configuration 900B, the device may further determine there are two systems currently sharing the channel.

In FIG. 9C, the preamble configuration 900C comprises a permutation of preamble location and content derived from three different frames transmitted by different base stations, and each frame contains a secondary preamble of a different content and transmitted in a different location. In one embodiment, a first frame includes a secondary preamble 604a transmitted in the first preamble location 606a having a preamble content 902a whose value is three (3), a second frame includes a secondary preamble 604b transmitted in the second preamble location 606b having a preamble content 902b whose value is four (4), and a third frame includes a secondary preamble 604c transmitted in a third preamble location 606c having a preamble content 902c whose value is five (5). In operation, if the wireless communication device receives any one of the above-described frames, the device may determine the preamble configuration 900C and based upon the preamble configuration 900C, determine that there are a total of three systems sharing the same channel In FIG. 9D the preamble configuration 900D comprises a permutation of preamble location and content derived from four different frames transmitted by different base stations, and each frame contains a secondary preamble of a different content and transmitted in a different location. In one embodiment, a first frame includes a secondary preamble 604a transmitted in the first preamble location 606a having a preamble content 902a whose value is six (6), a second frame includes a secondary preamble 604b transmitted in the second preamble location 606b having a preamble content 902b whose value is seven (7), a third frame includes a secondary preamble 604c transmitted in the third preamble location 606c having a preamble content 902c whose value is eight (8), and a fourth frame includes a secondary preamble 604d transmitted in a fourth preamble location 606d having a preamble content 902d whose value is nine (9). In operation, if the wireless communication device receives any one of the above-described frames, the device may determine the preamble configuration 900D and based upon the preamble configuration 900D, determine that there are a total of four systems that are sharing the same channel.

The above-described preamble content values in each preamble configuration are given by way of example only; and other preamble content values may alternatively be used. As seen in FIGS. 9A-9D, each secondary preamble contains a unique preamble content which partially depends on what preamble location the secondary preamble is transmitted. This enables the communication device, upon receiving any one frame from any base station that contains a secondary preamble, to determine the entire channel-sharing situation based upon the preamble location and/or content of the secondary preamble. Specifically, a preamble location of a detected preamble may connote a frame sequence assignment of a frame sequence cycle, and a preamble content of a detected preamble may connote how many systems are currently sharing a channel within a given shared wireless environment.

For example, if a device detects a preamble content 902*a* having a value of zero (0) in the first preamble location 606*a*, the device can determine two aspects of channel-sharing information 806 (of FIG. 8) from this preamble configuration. First, it can determine the frame that is assigned to the transmitting base station (e.g., the first frame in a four-frame cycle) from first preamble location 606*a*. Second, it can determine that there is only one base station "sharing" the channel from the preamble content 902*a* of value zero (0). If instead, a device detects a preamble content 902*a* having a value of one (1) in the first preamble location 606*a*, the device determines that a preamble configuration 900B exists. It first determines from the first preamble location 606*a* the frame that is assigned to the transmitting base station (e.g., the first frame in a four-frame cycle). Second, it determines that there are two base stations sharing the channel from the preamble content 902*a* of value one (1) in the first preamble location 606*a*.

As another example, if a device detects a preamble content 902*b* having a value of four (4) in the second preamble location 606*b*, the device determines that a preamble configuration 900C exists. Specifically, it first determines the frame that is assigned to the transmitting base station (e.g., the second frame in a four-frame cycle) from the second preamble location 606*b*. Second, it determines that there are three base stations sharing the channel from the preamble content 902*b* having a value of four (4). If instead, a device detects a preamble content 902*d* having a value of nine (9) in the fourth preamble location 606*d*, the device determines that it has detected a preamble configuration 900D. First, it determines the frame that is assigned to the transmitting base station (e.g., the fourth frame in a four-frame cycle) from fourth preamble location 606*d*. Second, it determines that there are four base stations sharing the channel from the preamble content 902*d* having a value of nine (9). Other preamble location and preamble content characteristic permutations may be decoded similarly to determine both a frame sequence assignment and a total number of base stations that are currently sharing a channel.

With these exemplary embodiments, there can be a known and/or determinable one-to-one correspondence between (i) a preamble's location and content (e.g., preamble characteristics 804 of FIG. 8) and (ii) a corresponding frame assigned to a base station from a frame sequence cycle and a total number of base stations that are sharing a channel (e.g., channel-sharing information 806). This one-to-one correspondence can be mapped in a data structure and stored at wireless devices. The data structure can be organized to include multiple entries similar to the illustrated association 802 of FIG. 8. Consequently, ascertaining a preamble's location and content from a set of secondary preambles (e.g., in accordance with one of preamble configurations 900A-900D) enables a wireless device to determine an assigned frame of a frame sequence cycle and a total number of base station systems involved in sharing a channel.

Each of the various permutations of preamble location and preamble content for a given potential set of base stations that are sharing a wireless channel is termed a preamble configuration. In other words, 900A, 900B, 900C, and 900D illustrate four different preamble configurations depending on which one of the potential set of channel-sharing base station situations is currently in effect. A preamble configuration inconsistency between two received preambles indicates a possible incongruency between what base stations think a current wireless sharing situation is and what is actually occurring. An exemplary preamble configuration inconsistency is described below with particular reference to FIG. 10.

Figure 10:
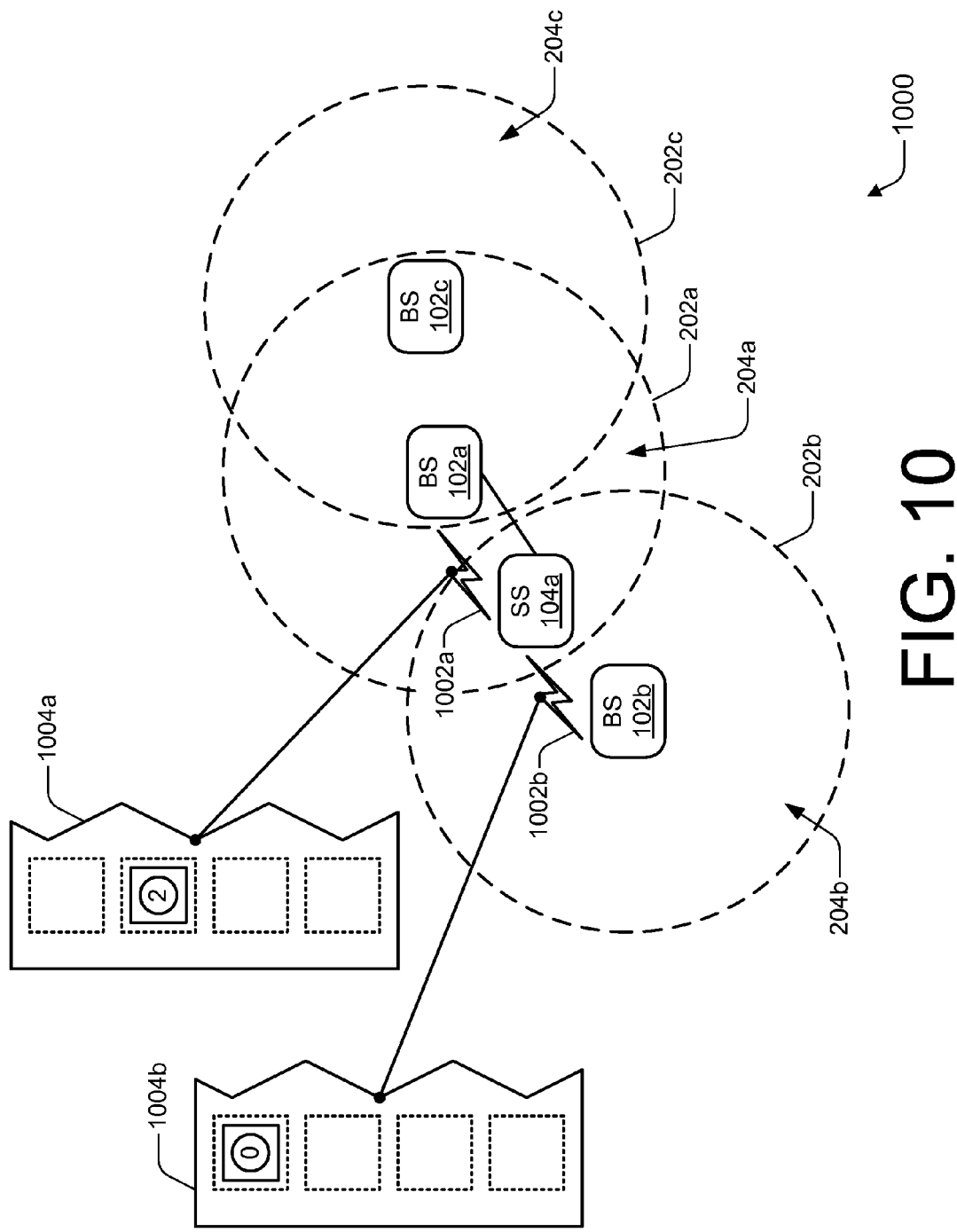
FIG. 10 is a block diagram illustrating an exemplary preamble configuration inconsistency that may be discovered by a wireless communication device.

FIG. 10 is a block diagram 1000 illustrating an exemplary preamble configuration inconsistency that may be discovered by a wireless device. In this example, the wireless device is a subscriber station 104, but it may alternatively be a base station 102 (e.g., during a quiet period). As illustrated, there are three wireless systems 204(*a,b,c*) with three respective base stations 102(*a,b,c*) having three respective communication regions 202(*a,b,c*). A subscriber station 104*a* is associated with the base station 102*a* and geographically situated within both communication regions 202*a* and 202*b*. In operation, the subscriber station 104*a* receives wireless communications 1002*a* and 1002*b* from base station 102*a* and base station 102*b*, respectively. Wireless communication 1002*a* includes a frame having a preamble configuration 1004*a* with a preamble content value of 2 at the second preamble location. This matches the preamble configuration 900B of FIG. 9B. Hence, subscriber station 104*a* expects to detect other preambles that are consistent with this preamble configuration. For example, it would expect to detect a preamble having a value of 1 at the first preamble location.

However, the wireless communication 1002*b* includes a frame having a preamble configuration 1004*b* with a preamble content value of 0 at the first preamble location. This matches the preamble configuration 900A of FIG. 9A. Hence, this preamble configuration 1004*b* is inconsistent with the preamble configuration 1004*a* that is received from the associated base station 102*a*. Consequently, the subscriber station 104*a* has detected a preamble configuration inconsistency. The subscriber station 104*a* may report this preamble configuration inconsistency to its base station 102*a*. Discovering and reporting a preamble configuration inconsistency is described further below with particular reference to FIG. 13.

By way of example, the flow diagrams 1100, 1200, 1300, and 1400 (of FIGS. 11, 12, 13, and 14, respectively) are described in terms of the relatively more specific secondary preambles 604, associated preamble locations 606, and associated preamble contents 902 (of FIGS. 6, 7A-7D, and 9A-9D). However, the illustrated and described principles of these flow diagrams are likewise applicable to the relatively more general preamble 406, associated preamble location 408, and associated preamble content 502 (of FIGS. 4A and 5A).

Figure 11:
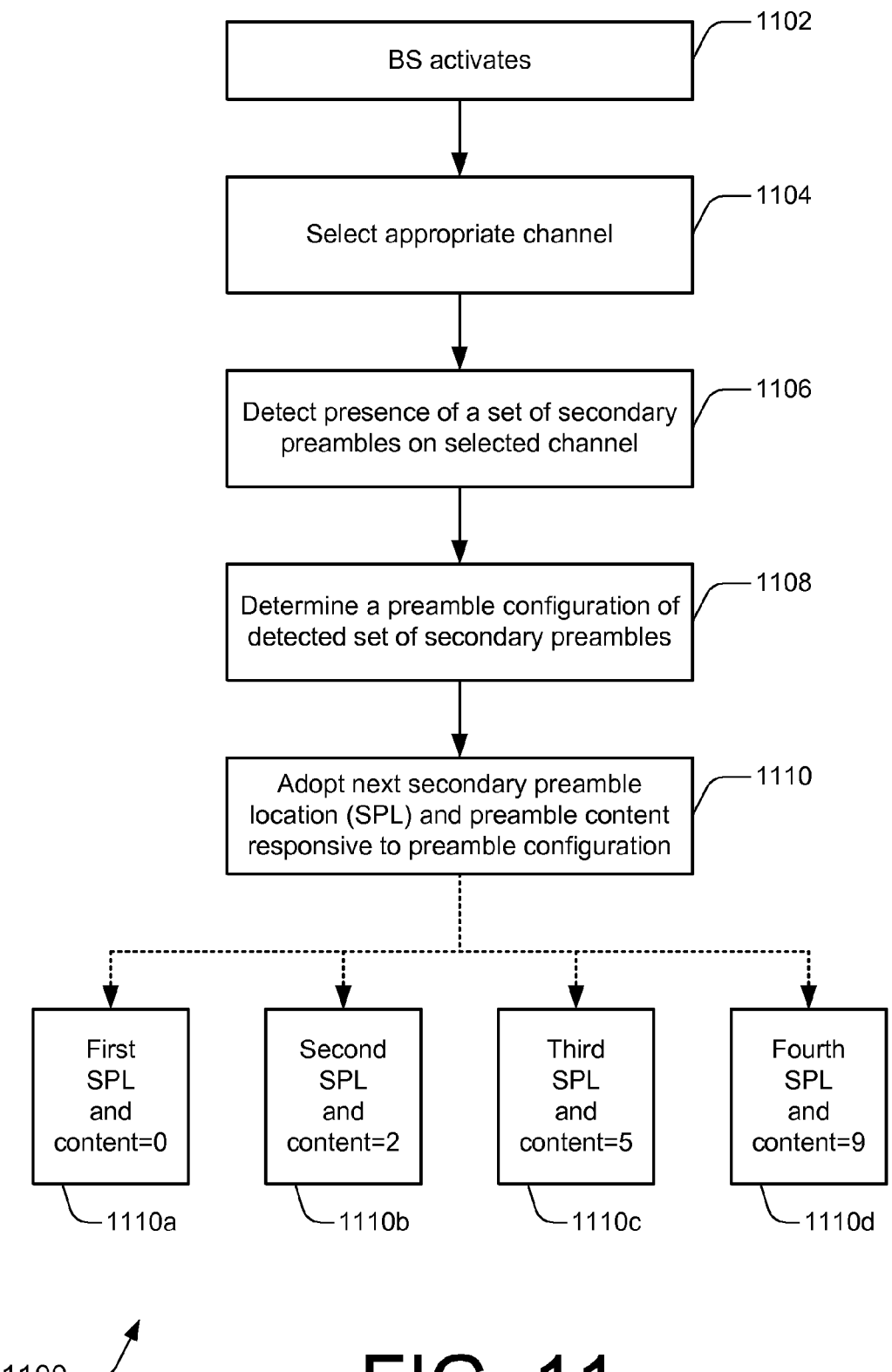
FIG. 11 is a flow diagram that illustrates an exemplary method for adopting a preamble location and content for a base station upon activation.

FIG. 11 is a flow diagram 1100 that illustrates an exemplary method for adopting a preamble location and content for a base station upon activation. The process starts at block 1102, where a base station is activated in a wireless communication environment. For example, a base station 102 may be initially started or reinitialized. At block 1104, an appropriate channel is selected by the base station. For example, a channel with relatively lower measurable interference and/or detectable activity may be selected. For instance, a dynamic channel selection or dynamic frequency selection (DCS or DFS) algorithm may be implemented by the activated base station.

At block 1106, a set of secondary preambles, if any, may be detected by the base station on the selected channel through scanning. For example, a base station may scan a channel to detect whether there are zero, one, two, three, four, or more secondary preambles 604 having preamble content 902 (from FIGS. 6-9D). Alternatively, a subscriber station may detect this set of secondary preambles currently transmitted on the selected channel and report to its associated base station. In an additional embodiment, a base station may acquire information on the currently transmitted secondary preambles from a backhaul, a network operator, or any other backend mechanism. At block 1108, based upon the detected secondary preambles, the preamble configuration of the entire wireless communication environment is determined. For example, the detected set of secondary preambles, or the corresponding preamble configuration, may be determined to correspond to one of the preamble configurations 900A-900D of FIGS. 9A-9D. As a result, the base station can determine the channel-sharing information, such as how many systems are currently sharing the channel.

At block 110, the next available secondary preamble location (SPL) and/or appropriate preamble content (e.g., the next available preamble position) can be adopted for the base station based in part on the determined preamble configuration. Without limiting various embodiments of the invention that may involve different scenarios, the adopting process works specifically as follows in each of the four scenarios shown in blocks 1110*a-d*.

As illustrated in block 1110*a*, because no secondary preamble is detected (i.e., the null set), the base station is the first known base station to select the current channel and it then adopts a first secondary preamble location and a unique preamble content value for the secondary preamble to be transmitted. For example, the base station may begin transmitting a frame with a secondary preamble 604*a* at the first preamble location 606*a* having a preamble content 502*a* value of zero (0), as shown in FIG. 9A.

At block 1110*b*, because the preamble configuration determined from the detected secondary preamble(s) shows one system already exists using the channel, the base station becomes the second known base station to share the current channel. Therefore, the base station adopts a second secondary preamble location and a unique preamble content value for preamble transmission. For example, the base station may begin transmitting a frame with a secondary preamble 604*b* at the second preamble location 606*b* having a preamble content 502*b* value of two (2), as shown in FIG. 9B.

For block 1110*c*, because the preamble configuration determined from the detected secondary preamble(s) shows two systems exist in the communication environment, the base station is the third base station to select the current channel. Thus, the base station adopts a third secondary preamble location and a unique preamble content value for preamble transmission. For example, the base station may begin transmitting a frame with a secondary preamble 604*c* at the third preamble location 606*c* having a preamble content 502*c* value of five (5), as shown in FIG. 9C.

For block 1110*d*, because the preamble configuration determined from the detected secondary preamble(s) shows three systems exist in the communication environment, the base station is the fourth base station to select the current channel. The base station adopts a fourth secondary preamble location and a unique preamble content value for preamble transmission. For example, the base station may begin transmitting a frame with a secondary preamble 604*d* at the fourth preamble location 606*d* having a preamble content 502*d* value of nine (9), as shown in FIG. 9D.

Figure 12:
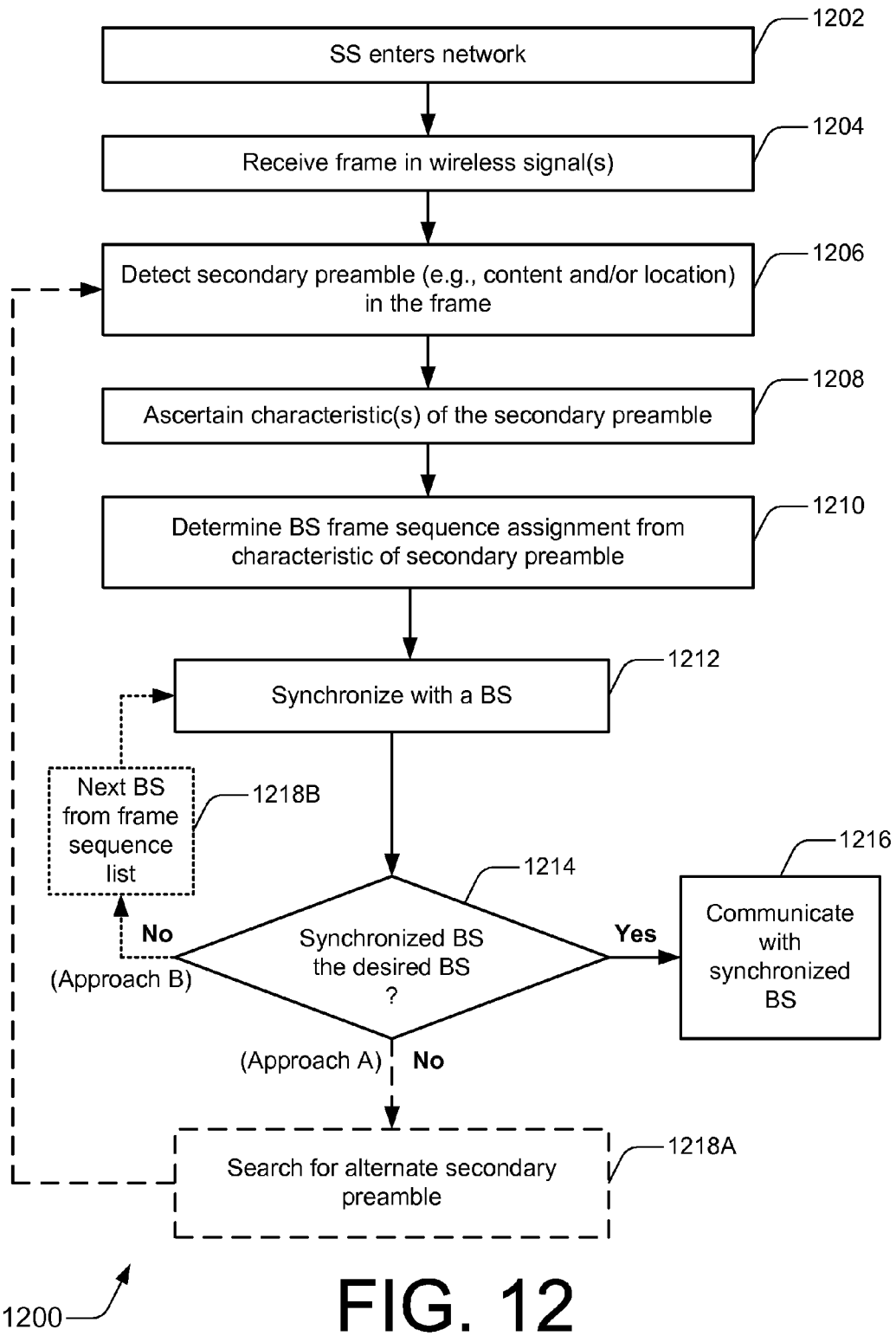
FIG. 12 is a flow diagram that illustrates an exemplary process of synchronization by a subscriber station upon network entry.

FIG. 12 is a flow diagram 1200 that illustrates an exemplary method for subscriber station network entry. The method starts at block 1202 when a subscriber station enters a wireless network. At block 1204, the subscriber station receives at least one frame in one or more wireless signals that contains a downlink sub-frame from a base station. At block 1206, a secondary preamble is detected in the downlink sub-frame by the subscriber station At block 1208, the subscriber station may ascertain at least one characteristic of the secondary preamble, such as a preamble location 606 and/or a preamble content 902 of the secondary preamble. At block 1210, a frame sequence assignment of a frame sequence cycle is determined responsive to a characteristic of the secondary preamble, where the frame sequence assignment corresponds to at least one base station transmitting the secondary preamble, while the frame sequence cycle may correspond to a list of base stations. In one embodiment, a frame sequence assignment may be determined responsive to preamble location, preamble content, preamble location and content, and so forth. At block 1212, the subscriber station starts to synchronize with the base station.

At block 1214, it is determined if the synchronized base station is the desired base station. For example subscriber station 104*a* may determine if the synchronized base station is the desired base station 102*a*. Generally, a subscriber station may determine if a synchronized base station is a desired base station in a number of ways. For example, the subscriber station may determine whether or not the embedded network operator ID of the synchronized base station corresponds to the desired network operator. Alternatively, a synchronized base station may be considered to be a desired base station merely if the base station accepts the subscriber station. If the synchronized base station is the desired base station (as determined at block 1214), then at block 1216 the subscriber station communicates with the synchronized base station. If, on the other hand, the synchronized base station is not the desired base station, then the method proceeds to block 1218A or 1218B depending on whether an approach A or an approach B is used.

In Approach A, the synchronizing process proceeds to block 1218A at which the subscriber station continues to search for an alternative frame containing an alternative secondary preamble from the wireless signals it received. If such an alternative secondary preamble is detected, the network acquisition process starting from block 1206 is repeated with respect to the alternative secondary preamble. In Approach B, the synchronizing process proceeds to block 1218B where a next base station is selected from the list of base stations corresponding to the frame sequence cycle as determined in block 1210. Then the synchronization process starting from block 1212 is repeated with respect to the next base station selected in block 1218B. In either Approach A or Approach B, the process is repeated until the desired base station is found and synchronized with the subscriber station.

The preamble location and content paradigm of the preamble configurations of FIGS. 8-11 can also enable a subscriber station to recognize and participate in ameliorating signal interference. In one embodiment, a subscriber station can report a discovered preamble inconsistency to its associated base station. As described above with reference to FIG. 10, a subscriber station 104*a*, while communicating with a base station 102*a* and a base station 102*b*, may be receiving from the two base stations secondary preambles that do not comport with a single preamble configuration. Thus, the subscriber station 104*a* communicates this preamble configuration inconsistency to one or both of base stations 102a or 102b so that they can amend their secondary preambles to achieve a harmonized preamble configuration for the channel-sharing environment. Methods for discovering and reporting a preamble configuration inconsistency at a subscriber station and for modifying preambles at base stations to obtain a harmonized preamble configuration are described below with particular reference to FIGS. 13 and 14.

Figure 13:
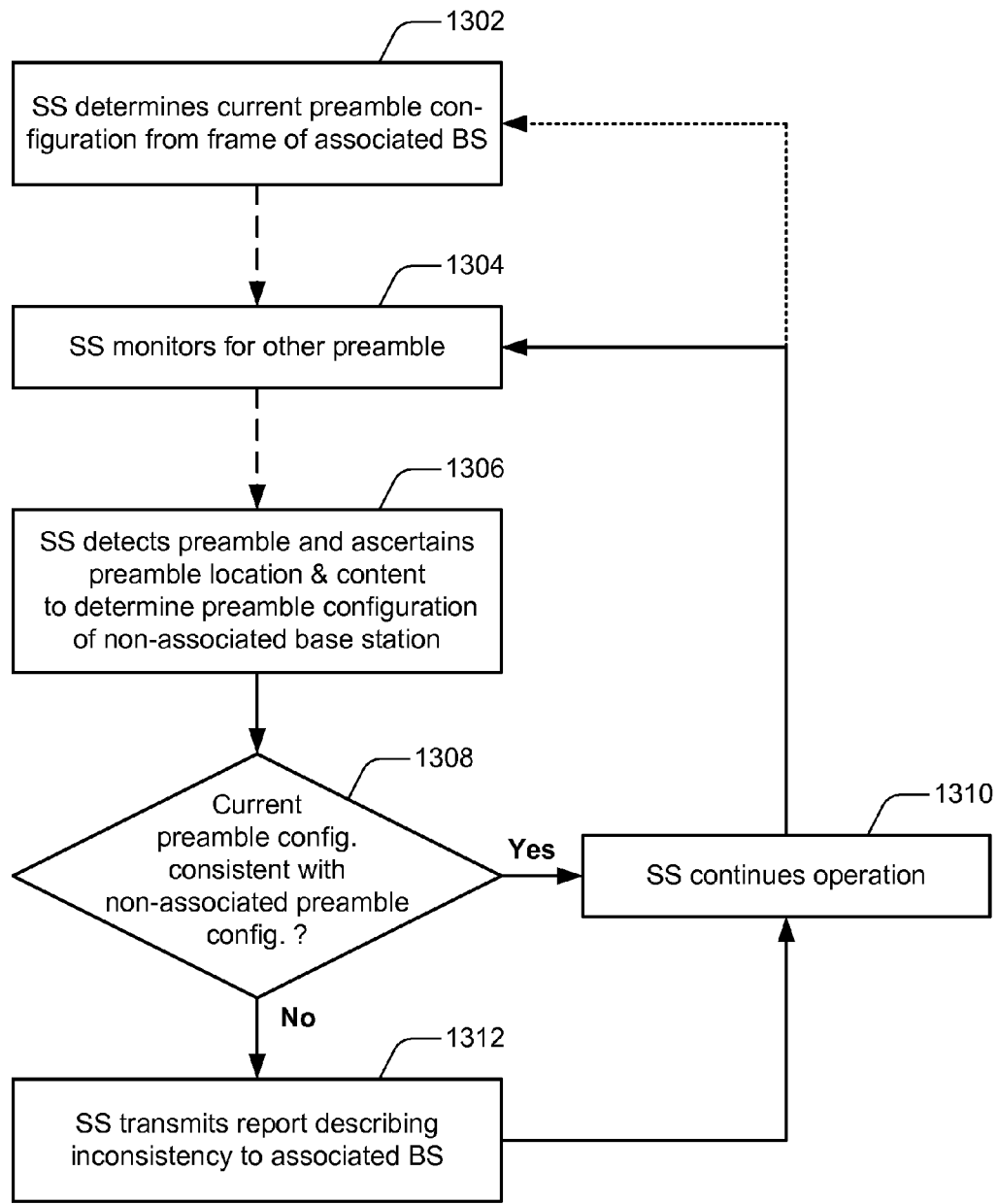
FIG. 13 is a flow diagram that illustrates an exemplary process by a subscriber station for detecting and reporting a preamble configuration inconsistency.

FIG. 13 is a flow diagram 1300 that illustrates an exemplary method for a subscriber station discovering and reporting a preamble configuration inconsistency. The preamble configuration inconsistency detection process starts at block 1302, where the subscriber station receives from its associated base station a frame containing a preamble from which the subscriber station may determine a current preamble configuration that reflects the entire channel-sharing situation in the communication environment. However, the subscriber station may also receive frames from other base stations that it is not directly associated with. For those received frames, the subscriber station keeps monitoring to detect preambles embedded therein at block 1304. At block 1306, if the subscriber station detects such a preamble and ascertains a preamble location and/or a preamble content of the detected preamble, then the subscriber station can determine another preamble configuration which may be identical to or different from the current preamble configuration determined as in block 1302.

At block 1308, the subscriber station compares the current preamble configuration corresponding to its associated base station and the other preamble configuration corresponding to a non-associated base station. If the two preamble configurations are consistent, then the subscriber station continues its normal operations at block 1310. If, however, the two preamble configurations are not consistent, the process proceeds to block 1312, at which the subscriber station transmits a report describing the inconsistency to its associated base station. For example, the subscriber station 104 may transmit a (e.g., solicited or unsolicited) REP-RSP message to its associated base station 102. This enables its associated base station 102 to take appropriate measures to amend its preamble in response to receiving the preamble configuration inconsistency report. An example of appropriate measures is described below with particular reference to FIG. 14.

Figure 14:
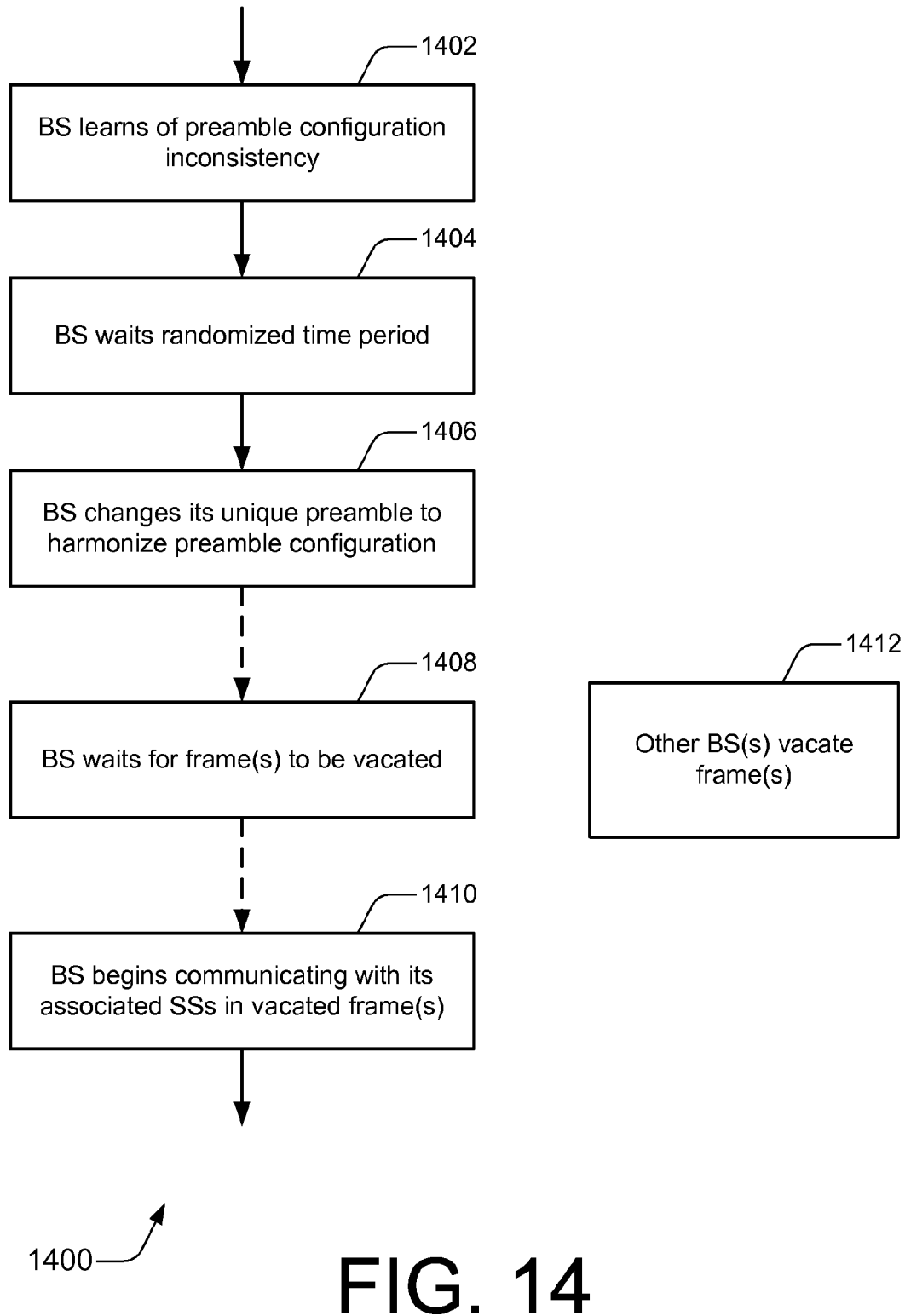
FIG. 14 is a flow diagram that illustrates an exemplary method to modify a preamble configuration.

FIG. 14 is a flow diagram 1400 that illustrates an exemplary method for modifying preambles transmitted by a base station in order to update a preamble configuration corresponding to the entire system-sharing communication environment. The exemplary process starts at block 1402 where a base station, upon receiving an inconsistency report from one of its associated subscriber stations, learns of the preamble configuration inconsistency. In one embodiment, at block 1404, the base station waits for a randomized time period to avoid ping-pong situations in which another base station is likewise changing its preambles. At block 1406, the base station changes its unique preamble to harmonize with preambles transmitted by other base stations so that the overall preamble configuration is consistent. For example, as shown in FIG. 10, after waiting for a randomized time period the base station 102b can update its preamble content 902 from a value of zero (0) to a value of one (1) in order to be consistent with the preamble transmitted by the base station 102a.

In another embodiment, at block 1408, a newly-entering base station waits for the appropriate frame(s) of a frame sequence cycle to be vacated by other base stations in the channel-sharing environment as shown in block 1412, and then at block 1410, the base station may use those vacated frames to communicate with its associated subscriber stations with updated preambles. If the base station 102b had been using all four frames 304(a,b,c,d) of the frame sequence cycle (as shown in FIGS. 3A-3B), in response to detecting the new base station 102a based upon the inconsistent preamble configuration, the base station 102b vacates frames 302(a,c) and the base station 102a may start using the frames 302(a,c) to communicate with its associated subscriber stations.

The above-described process with reference to the flow diagram 1400 is likely to be triggered when a new base station enters into the channel-sharing communication environment, although it may also be used in many other scenarios, such as when a base station leaves the communication environment. In operation, the existing base stations are regularly listening during their quiet frames to detect when a particular unique preamble is no longer being transmitted. The frame sequence assignments, or frame distribution, of a frame sequence cycle is maintained based on the unique preambles that are heard during these quiet frames. If a subscriber station detects that a unique preamble that was once heard has ceased transmission, then the subscriber station sends either a solicited or unsolicited REP-RSP message to reflect the new local interference situation. The base station then acts by creating an appropriate preamble configuration for the new local channel-sharing wireless environment that recaptures the unused frame of the frame sequence cycle for use by the remaining base stations of the new local channel-sharing the wireless environment.

Figure 15A:
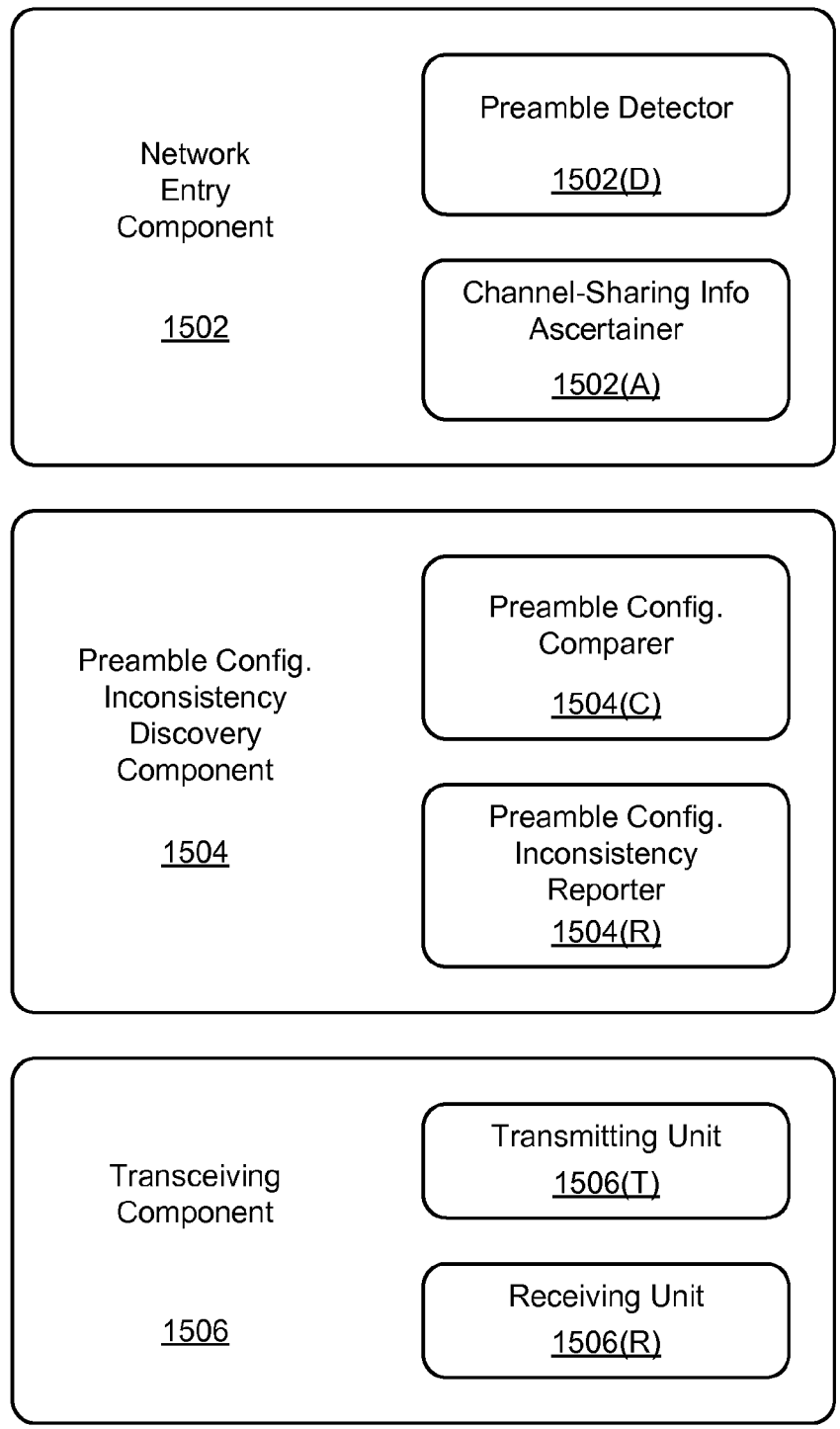
FIGS. 15A and 15B are block diagrams illustrating exemplary components for a subscriber station and a base station, respectively, that can be utilized to implement exemplary embodiments for co-channel co-existence via enhanced frame preambles in a shared wireless environment.
Figure 15B:
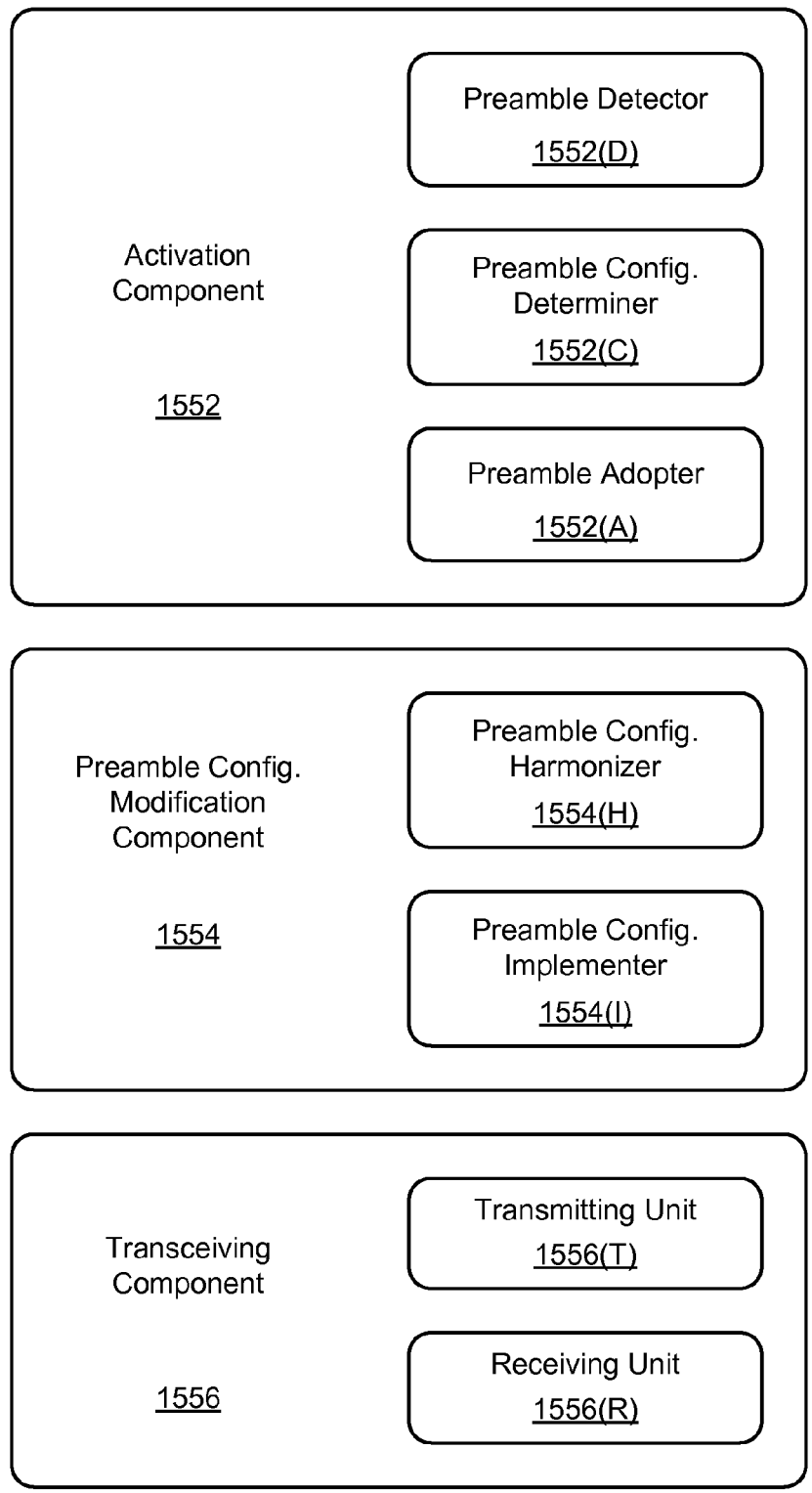

FIGS. 15A and 15B are block diagrams 1500 and 1550 illustrating exemplary components for a subscriber station and a base station, respectively, that can be utilized to implement exemplary embodiments of the present invention. Base stations and subscriber stations may both be considered wireless communication devices generally. An exemplary general wireless device is described further herein below with particular reference to FIG. 17. The illustrated components of FIGS. 15A and 15B may be embodied as software, firmware, hardware, fixed logic circuitry, some combination thereof and so forth.

As illustrated in FIG. 15A, the block diagram 1500 for a subscriber station 104 includes a network entry component 1502, a preamble configuration inconsistency discovery component 1504, and a transceiving component 1506. In one embodiment, the network entry component 1502 is configured to perform one or more of the network acquisition and synchronizing actions described above with particular reference to FIG. 12. In an embodiment, the network entry component 1502 includes a preamble detector 1502(D) and a channel-sharing information ascertainer 1502(A). The preamble detector 1502(D) is configured to detect a preamble that is transmitted by a base station. The channel-sharing information ascertainer 1502(A) is configured to determine one or more characteristics of the detected preamble, such as a preamble location or content, from which the ascertainer 1502(A) ascertains channel-sharing information 806, such as frame sequence assignment 410 and/or a total number of channel-sharing systems 504, for the entire wireless communication environment.

In one embodiment, the preamble configuration inconsistency discovery component 1504 is configured to perform one or more of the actions described above with particular reference to FIG. 13. In an exemplary embodiment, the preamble configuration inconsistency discovery component 1504 includes a preamble configuration comparer 1504(C) and a preamble configuration inconsistency reporter 1504 (R). The preamble configuration comparer 1504(C) is configured to compare a current preamble configuration corresponding to a base station associated with the subscriber station with another preamble configuration determined from a preamble transmitted by another non-associated base station, and determine whether an inconsistency exists. The preamble configuration inconsistency reporter 1504(R) is configured to, in response to the inconsistency determined by the preamble configuration comparer 1504(C), formulate a report that is sent to the subscriber station's associated base station.

In one embodiment, the transceiving component 1506 enables the subscriber station 104 to communicate wirelessly via communication links 106 with a base station. In an exemplary embodiment, the transceiving component 1506 includes a transmitting unit 1506(T) and/or a receiving unit 1506(R). The transmitting unit 1506(T) and receiving unit 1506(R) each may include one or more transmitters or receivers, and/or one or more transmitting chains or receiving chains. Having multiple (e.g., at least two) receiving chains and/or transmitting chains enables a subscriber station 104 to simultaneously engage in multiple wireless communications 106. Each transmitter and receiver may include one or more radios (not explicitly shown) that are dedicated or shared.

As illustrated in FIG. 15B, the block diagram 1550 for a base station includes an activation component 1552, a preamble configuration modification component 1554, and a transceiving component 1556. In one embodiment the activation component 1552 is configured to perform one or more of the actions described above with particular reference to FIG. 11. In an exemplary embodiment, the activation component 1552 includes a preamble detector 1552(D), a preamble configuration determiner 1552(C), and a preamble adopter 1552(A). The preamble detector 1552(D) is configured to select and scan a channel in the wireless communication environment to detect preambles transmitted on the channel. In response to the detected preambles, the preamble configuration determiner 1552(C) is configured to determine the preamble configuration reflecting the channel-sharing-situation in the wireless environment. The preamble adopter 1552(A) is configured to adopt an appropriate preamble, including an appropriate preamble location and appropriate preamble content that reflect the updated channel-sharing information. The activation component 1552 may then enable the base station to begin transmitting the adopted preamble.

In one embodiment, the preamble configuration modification component 1554 is configured to perform one or more of the actions described above with particular reference to FIG. 14. In an exemplary embodiment, the preamble configuration modification component 1554 includes a preamble configuration harmonizer 1554(H) and a preamble configuration implementer 1554(I). The preamble configuration harmonizer 1554(H) is configured to receive the preamble configuration inconsistency report from a subscriber station associated with the base station, and in response to the report, determine whether the currently transmitted preamble needs to be updated with a new preamble location and/or preamble content in order to harmonize with other preambles transmitted by other base stations and achieve a consistent preamble configuration, and if so, what changes should be made. The preamble configuration implementer 1554(I) is configured to, in response to the determination by the preamble configuration harmonizer, implement the changes to the preamble to reflect the correct preamble configuration, and enable the base station to transmit the updated preamble.

In one embodiment, the transceiving component 1556 is configured to enable the base station 102 to communicate wirelessly via communication links 106. In an exemplary embodiment the transceiving component 1556 includes a transmitting unit 1556(T) and/or a receiving unit 1556(R). The transmitting unit 1556(T) and receiving unit 1556(R) each may include one or more, and usually multiple, transmitters or receivers, respectively, and/or one or more transmitting chains or receiving chains. Each transmitter and receiver may include one or more radios (not explicitly shown) that are dedicated or shared.

Figure 17:
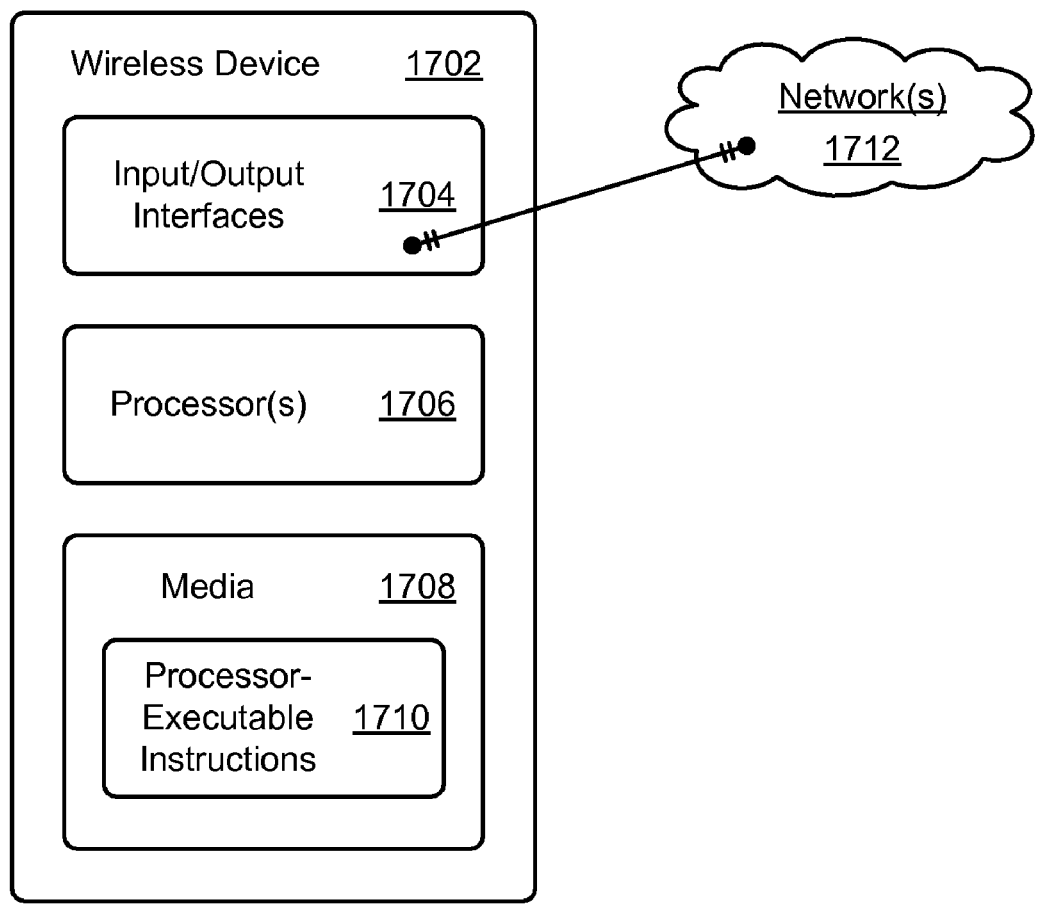
FIG. 17 is a block diagram of an exemplary wireless device that is capable of implementing embodiment(s) for co-channel co-existence that may be facilitated via enhanced frame preambles.

FIG. 17 is a block diagram of an exemplary wireless device 1702 in accordance with one embodiment of the present invention. As illustrated in FIG. 17, the wireless device 1702 includes one or more input/output (I/O) interfaces 1704, at least one processor 1706, and one or more media portions 1708. The I/O interfaces 1704 enable the wireless device 1702 to communicate over one or more networks 1712, such as a wireless network (or network 108 of FIG. 1 for a base station implementation). The I/O interfaces 1704 may include, by way of example without limitation, an antenna, an RF component, any component of a baseband integrated circuit (IC), a radio, transceiver, some combination thereof, and so forth. The I/O interfaces 1704 may also include interfaces for communicating over wired networks, such as a network interface card, a modem, one or more network ports, a USB connector, some combination thereof, and so forth.

Processor(s) 1706 may be implemented using any applicable processing-capable technology. Processor(s) 1706 may be one or more processors such as central processing units (CPUs), microprocessors, controllers, dedicated processing circuits, digital signal processors (DSPs), processing portion(s) of an ASIC, some combination thereof, and so forth. Generally, processor 1706 is capable of executing, performing, and/or otherwise effectuating processor-executable instructions, such as processor-executable instructions 1710 in the media portion 1708.

The media 1708 may be any available media that is included as part of and/or accessible by the wireless device 1702. It includes volatile and non-volatile media, removable and non-removable media, storage and transmission media (e.g., wireless or wired communication channels), and so forth. The media 1708 is tangible media when it is embodied as a manufacture and/or a composition of matter. By way of example only, storage media may include an array of disks or flash memory for longer-term mass storage of processor-executable instructions, random access memory (RAM) for shorter-term storing of instructions that are currently being executed and/or otherwise processed, hard-coded logic media (e.g., an application-specific integrated circuit (ASIC), a field programmable gate-array (FPGA), etc.), some combination thereof, and so forth. Transmission media may include link(s) on networks for transmitting communications and so forth.

In one embodiment, the media 1708 is comprised of one or more processor-accessible media, such as the processor-executable instructions 1710 that are executable by the processor 1706 to enable the wireless device 1702 to perform the various functions and operations described herein, including (by way of example only) any of those that are associated with the illustrated features, aspects, components, and flow diagrams of FIGS. 1-16B. It should be noted that processor(s) 1706 and media 1708, including the processor-executable instructions 1710 thereof, may be integrated on a single chip or otherwise interwoven.

Realizations for enhanced frame preambles to support co-channel co-existence in a wireless environment may be described in the general context of processor-executable instructions. Processor-executable instructions may include programs, applications, coding, modules, objects, interfaces, components, data structures, frame organizations and/or preamble content, etc. that perform and/or enable the performance of particular tasks and/or implement particular data structures. Processor-executable instructions may be located in separate storage media, executed by different processors, and/or propagated over or extant on various transmission media. Moreover, processor-executable instructions may be embodied as software, firmware, hardware, fixed logic circuitry, some combination thereof, and so forth.

The devices, actions, features, functions, procedures, schemes, approaches, architectures, configurations, components, etc. of FIGS. 1-17 are illustrated in diagrams that are divided into multiple blocks. However, the order, interconnections, interrelationships, layout, etc. in which FIGS. 1-17 are described and/or shown are not intended to be construed as a limitation, and any number of the blocks can be modified, combined, rearranged, augmented, omitted, etc. in any manner to implement one or more methods, apparatuses, systems, devices, procedures, media, arrangements, etc. for enhanced frame preambles that support co-channel co-existence in a shared wireless environment.

Moreover, although systems, apparatuses, devices, media, methods, procedures, techniques, schemes, approaches, arrangements, and other exemplary embodiments have been described in language specific to structural, logical, algorithmic, and functional features and/or diagrams, it is to be understood that the invention defined in the appended claims is not necessarily limited to the specific features or acts described above. Rather, the specific features and acts described above are disclosed as exemplary forms of implementing the claimed invention.

What is claimed is:

1. A method comprising:
   receiving at least a downlink subframe in one or more wireless communication signals in a wireless communication environment;
   detecting a preamble in the downlink subframe;
   ascertaining at least one characteristic of the preamble;
   determining channel-sharing information for the wireless communication environment based upon the at least one characteristic of the preamble; and
   synchronizing a subscriber station based upon the channel-sharing information for the wireless communication environment;
   wherein the wireless communication environment comprises a finite number of base stations that share a given channel, and a finite number of subscriber stations respectively associated with the finite number of base stations.

2. The method as recited in claim 1, wherein the at least one characteristic of the preamble comprises a preamble location within the downlink subframe, the preamble location corresponding to a subchannelization having a set of subchannels that are contiguous or noncontiguously-distributed within the downlink subframe.

3. The method as recited in claim 2, wherein at least a portion of the preamble is transmitted over the set of subchannels.

4. The method as recited in claim 2, wherein the subchannelization is pre-defined by dividing a channel being shared in the wireless communication environment, wherein the subchannelization has a length partially determined by a channel bandwidth.

5. The method as recited in claim 1, wherein the at least one characteristic of the preamble comprises a preamble content having a pre-defined value, the preamble content connoting a total number of channel-sharing systems in the wireless communication system.

6. The method as recited in claim 1, wherein the step of synchronizing comprises:
   at the subscriber station, determining that the at least one characteristic of the preamble comprises a preamble location within the downlink subframe, and further, determining from the preamble location a frame sequence assignment within a frame sequence cycle of the wireless communication environment; and
   synchronizing the subscriber station with a first base station of the finite number of base stations that uses at least one frame in accordance with the frame sequence assignment.

7. The method as recited in claim 6, further comprising:
   at the subscriber station, determining if the first base station is a desired base station, and if not, synchronizing the subscriber station with a next base station of the finite number of base stations that uses at least one other frame in accordance with the frame sequence assignment; and
   at the subscriber station, determining if the next base station is the desired base station.

8. The method as recited in claim 6, further comprising:
   at the subscriber station, determining if the first base station is a desired base station, and if not,
   receiving an alternative downlink subframe;
   detecting an alternative preamble in the alternative downlink subframe;
   ascertaining at least one characteristics of the alternative preamble;
   determining alternative channel-sharing information based upon the at least one characteristic of the alternative preamble; and
   synchronizing the subscriber station with an alternative base station based in part upon the alternative channel-sharing information.

9. The method as recited in claim 6, further comprising:
   determining at the subscriber station whether the first base station is a desired base station, and if so, communicating with the first base station.

10. A method comprising:
    receiving at least a downlink subframe at a subscriber station in one or more wireless communication signals in a wireless communication environment;
    detecting a preamble in the downlink subframe;
    ascertaining at least one characteristic of the preamble; and
    determining channel-sharing information for the wireless communication environment based on
    a preamble location; and
    determining from the preamble location a frame sequence assignment within a frame sequence cycle of multiple frames in the wireless communication environment,
    wherein the frame sequence assignment corresponds to at least one frame in the frame sequence cycle that is assigned to a base station.

11. A method comprising:
    receiving at least a downlink subframe at a subscriber station in one or more wireless communication signals in a wireless communication environment;
    detecting a preamble in the downlink subframe;
    ascertaining at least one characteristic of the preamble; and
    determining channel-sharing information for the wireless communication environment based on
    preamble content having a unique value; and
    determining from the preamble content a total number of channel-sharing systems in the wireless communication environment.

12. One or more processor-accessible media comprising processor-executable instructions that, when executed, direct a wireless communication device to perform acts comprising:

receiving at least a downlink subframe in one or more wireless communication signals in a wireless communication environment;

detecting a preamble in the downlink subframe;

ascertaining at least one characteristic of the preamble;

determining channel-sharing information for the wireless communication environment based upon the at least one characteristic of the preamble; and synchronizing a subscriber station based upon the channel-sharing information for the wireless communication environment;

wherein the wireless communication environment comprises a finite number of base stations that share a given channel, and a finite number of subscriber stations respectively associated with the finite number of base stations.

13. A wireless communication device comprising:

at least one transceiving component configured to receive one or more wireless communication signals in a wireless communication environment; and one or more processors configured to:

receive at least a downlink subframe in the one or more wireless communication signals;

detect a preamble in the downlink subframe;

ascertain at least one characteristic of the preamble; and determine channel-sharing information for the wireless communication environment based upon the at least one characteristic of the preamble;

the one or more processors being configured to synchronize the transceiving component based upon the channel-sharing information for the wireless communication environment;

wherein the wireless communication environment comprises a finite number of base stations that share a given channel, and a finite number of subscriber stations respectively associated with the finite number of base stations.

* * * * *